US008797388B2

(12) United States Patent
Masumura et al.

(10) Patent No.: US 8,797,388 B2
(45) Date of Patent: Aug. 5, 2014

(54) MOUNTING ACCURACY INSPECTION METHOD AND INSPECTION APPARATUS USING THE INSPECTION METHOD

(75) Inventors: Kazunori Masumura, Kanagawa (JP); Koji Shigemura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 475 days.

(21) Appl. No.: 13/211,629

(22) Filed: Aug. 17, 2011

(65) Prior Publication Data

US 2012/0050487 A1 Mar. 1, 2012

(30) Foreign Application Priority Data

Aug. 25, 2010 (JP) ................................. 2010-188386

(51) Int. Cl.
*H04N 13/02* (2006.01)
*H04N 13/04* (2006.01)
*G02B 27/22* (2006.01)
*G01M 11/02* (2006.01)
*G09G 3/00* (2006.01)

(52) U.S. Cl.
CPC ....... *H04N 13/0406* (2013.01); *H04N 13/0425* (2013.01); *G02B 27/2214* (2013.01); *G09G 3/006* (2013.01); *G01M 11/0221* (2013.01)
USPC ................. 348/46; 348/51; 348/57; 359/463; 356/124; 356/401

(58) Field of Classification Search
CPC ..... G09G 3/0003; G09G 3/20; G09G 3/3614; G09G 3/3688; H04N 13/0406
USPC .................................................... 348/46, 51
See application file for complete search history.

(56) References Cited

U.S. PATENT DOCUMENTS

| 6,091,479 | A | * | 7/2000 | Frosig et al. ..................... 355/22 |
| 2006/0245063 | A1 | * | 11/2006 | Ra et al. ......................... 359/619 |
| 2009/0235542 | A1 | * | 9/2009 | Miyazaki et al. ............... 33/286 |
| 2009/0273720 | A1 | | 11/2009 | Tanaka |
| 2010/0026993 | A1 | * | 2/2010 | Kim et al. ....................... 356/124 |
| 2010/0066817 | A1 | * | 3/2010 | Zomet et al. .................... 348/51 |
| 2010/0265578 | A1 | * | 10/2010 | Kayanuma .................... 359/463 |

FOREIGN PATENT DOCUMENTS

| JP | 07-028178 | 1/1995 |
| JP | 2004-280087 | 10/2004 |
| JP | 2006-079097 | 3/2006 |

(Continued)

OTHER PUBLICATIONS

Japnese Official Action—2010-188386—Apr. 22, 2014.

*Primary Examiner* — Jay Patel
*Assistant Examiner* — Neil Mikeska
(74) *Attorney, Agent, or Firm* — Young & Thompson

(57) ABSTRACT

A display apparatus to be inspected includes: a display panel in which pixel groups are arranged; and an optical element for providing image display for N viewpoints (N is a natural number more than one) from the pixel groups. An inspection apparatus includes: a image output device for outputting a test pattern including image signals different in the respective viewpoints to the display apparatus; and an extraction device for extracting the slope and the position of a boundary line segment in an inspection image displayed on the display apparatus. The extraction device detects positional accuracy between the display panel and the optical element on the basis of the slope and the position extracted by the extraction device.

24 Claims, 23 Drawing Sheets

(56) References Cited

FOREIGN PATENT DOCUMENTS

| | | |
|---|---|---|
| JP | 2007-065441 | 3/2007 |
| JP | 2008-015394 | 1/2008 |
| JP | 2009-162620 | 7/2009 |
| JP | 2009-223193 | 10/2009 |
| JP | 2009-300816 | 12/2009 |
| JP | 2010-019987 | 1/2010 |
| WO | 2007/034611 | 3/2007 |

\* cited by examiner

DISTANCE BETWEEN COLOR FILTER AND LENS

OBSERVATION DISTANCE

CAMERA

Fig.9
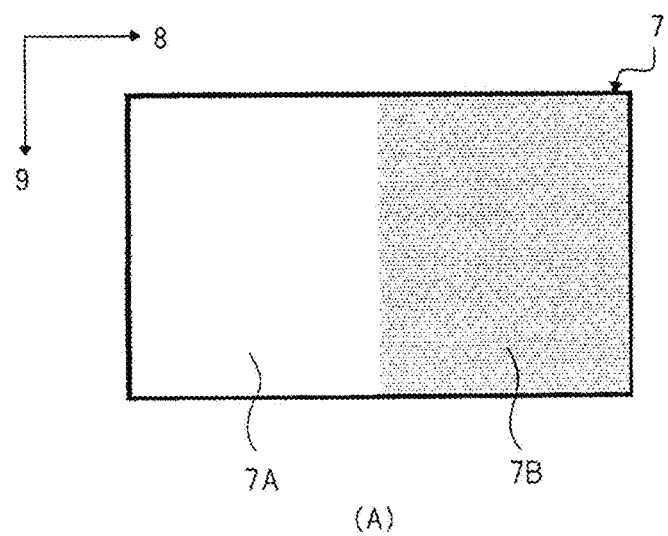
(A)
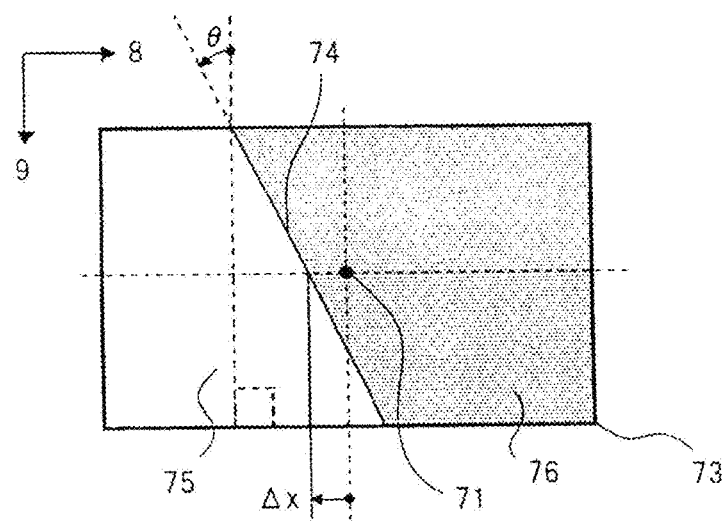
(B)

(A)  (B)

(A)  (B)

MOUNTING ACCURACY INSPECTION METHOD AND INSPECTION APPARATUS USING THE INSPECTION METHOD

This application is based upon and claims the benefit of priority from Japanese patent application No. 2010-188386, filed on Aug. 25, 2010, the disclosure of which is incorporated herein in its entirety by reference.

TECHNICAL FIELD

The present invention relates to a mounting accuracy inspection method for a display apparatus for displaying a stereoscopic image, and an inspection apparatus using the inspection method.

BACKGROUND ART

In order to acquire an image causing a person to sense a stereoscopic effect and depth, there is a method of utilizing a difference between viewpoints of right and left eyes. This difference is a "binocular parallax" where object images viewed by right and left eyes are different from each other. A display apparatus has been developed which utilizes the binocular parallax, presents different images for the right and left eyes of an observer and thereby makes the observer sense a stereoscopic effect.

Among such display apparatuses, a configuration has been known which provides a display panel with pixels for displaying images for right and left eyes and causes optical means, such as a lenticular lens and a parallax barrier, to separate images corresponding to right and left eyes. The optical means is not limited to a static element, such as a fixed lens. Instead, an electrooptic element, such as a liquid crystal lens and a liquid crystal barrier, may be adopted. A configuration is also known which adopts optical means for separating light emitted from a light source such as a backlight for right and left eyes in a time division manner. The number of viewpoints may be selected in various manners from two viewpoints to multi-viewpoints in accordance with the application or usage circumstances of the observer. The two viewpoints have a limited stereoscopic visual field, which provides a stereoscopic effect. However, two viewpoints have an advantage providing high 3D (three-dimensional) resolution. On the other hand, the multi-viewpoints have lower 3D resolution but have an advantage of being capable of providing motion parallax and enlarging the stereoscopic visual field.

In order to correctly separate a prescribed image for the right and left eyes of the observer, it is important that the amount of positional deviation of optical means from a display panel is small. In other words, mounting accuracy (hereinafter referred to as relative positional accuracy between the display panel and the optical means) of the optical means with respect to the display panel is important. Deviation between positions of the display panel and the optical means causes a reverse view phenomenon, in which right and left images are replaced with each other depending on viewpoints, and a phenomenon in which the right and left images are mixed with each other. In these cases, the observer cannot recognize the stereoscopic image, or the region where the stereoscopic image can be recognized is narrowed. Accordingly, in the case of manufacturing a display apparatus for displaying an image that makes an observer sense a stereoscopic effect, it is important to manage relative positional accuracy between the display panel and the optical means.

In order to address these problems, various methods for evaluating mounting accuracy have been proposed. Typically, a method of reading relative positional accuracy between a display panel and optical means using a length measurement microscope or the like, and a method that detects light separated for right and left eyes by an optical property measurement apparatus, such as a conoscope system and a Fourier system, and that acquires a region where a stereoscopic image can be recognized have been known.

However, these evaluation methods require much preparation time and have a lot of operation procedures, and equipment required for evaluation is expensive. Accordingly, there is a problem in that adoption of these methods increases inspection cost.

Further, there is a method that preliminarily provides markers on a display panel and on optical means, detects the shapes and positions of the markers using an optical system and a sensor more inexpensive than the length measuring microscope and thereby detects relative positional accuracy between the optical means and the display panel. However, according to such a method, it is difficult to photograph the markers of the display panel and the optical means at the same focus. Further, there is another problem in that the positional deviation cannot be detected at an accuracy required according to tendency of increasing high definition in a display panel.

Thus, a method has been proposed that acquires a relative positional accuracy of a display panel and optical means without using expensive equipment by observing a prescribed test pattern.

For instance, in Japanese Patent Laid-Open No. 2007-65441, a method for deriving arrangement lens specifications that causes a display apparatus, such as an inspection target to display a group of parallel lines, matches color stripes observed via a lenticular lens array with a prescribed condition and thereby acquires an arrangement direction of the lenticular lens array arranged on the screen of the display apparatus for stereoscopic view.

FIG. 1 is a schematic diagram showing an example of an inspection image displayed on a display apparatus illustrated in Japanese Patent Laid-Open No. 2007-65441.

As shown in FIG. 1, in the art described in Japanese Patent Laid-Open No. 2007-65441, the display apparatus to be inspected displays a group of parallel lines including equidistant parallel lines. Here, the top left corner of the display screen is defined as $O_1$. A horizontal direction with respect to the reference position $O_1$ is defined as $x_p$ axis, and the vertical direction is defined as $y_p$ axis. The angle θ between each line in the parallel line group and $y_p$ axis is defined as "line group angle". The separation m between adjacent lines is defined as "line group separation". The distance dx at a position on the line nearest from reference position $O_1$ and on $x_p$ axis from reference position $O_1$ is defined as "horizontal reference position". If angle θ of the parallel line group, line group separation m and horizontal reference position dx are adjusted so as to meet conditions in which, for instance, the angle of color stripes viewed via the lenticular lens array and the arrangement angle of the lenticular lens array match with each other, the arrangement lens specifications, such as a lens pitch and an arrangement angle of the lenticular lens array, can be acquired even though the arrangement base position of the lenticular lens is unknown.

Japanese Patent Laid-Open No. 2006-79097 has proposed a method for manufacturing a three-dimensional image display apparatus that performs arrangement and fixation so as to eliminate the positional deviation between an image panel and a three-dimensional image formation apparatus (optical means) while observing a displayed three-dimensional image.

FIG. 2 is a schematic diagram showing a principle of checking the lens mounting accuracy described in Japanese Patent Laid-Open No. 2006-79097.

As shown in FIG. 2, when light beams emitted from two pixel arrays are refracted by a lens such that the light beam from one pixel array reaches the right eye and the light beam from the other pixel array reaches the left eye, no light reaches the center of both eyes, and a black band appears at the center of a three-dimensional image. In a case where optical means (three-dimensional image forming apparatus), such as a lens, and two pixel arrays of the image panel are fixed without positional deviation, if an observer takes a look at a prescribed observation distance (or a prescribed focal length) from the center of the image panel, the black band appears at the center of the image panel in a vertical direction. In Japanese Patent Laid-Open No. 2006-79097, for instance, the three-dimensional image forming apparatus is arranged on the image panel such that the black belt is disposed at the center of the panel. Further, Japanese Patent Laid-Open No. 2006-79097 describes that the three-dimensional image forming apparatus can be disposed on the image panel without positional deviation by displaying different images on the two pixel arrays.

Japanese Patent Laid-Open No. 2008-015394 proposes a method of manufacturing a stereoscopic image display apparatus that forms an image for alignment on a synthesized image synthesized from original images for different viewpoints and for at least one of the top and bottom of the synthesized image, and that aligns the synthesized image and optical means with each other from a position nearer the synthesized image than the position from which the stereoscopic image is viewed on the basis of information of the image for alignment observed via the optical means for extracting a prescribed viewpoint image.

FIG. 3 is a schematic diagram showing an image for alignment described in Japanese Patent Laid-Open No. 2008-015394.

FIG. 3 illustrates a manner where images for alignment are disposed at the top and bottom of synthesized image 102, in which original images for three viewpoints are divided along the vertical direction and disposed. The images for alignment have different colors corresponding to the original images for different viewpoints.

When the images for alignment are viewed from a point nearer the synthesized image than the view point of the stereoscopic image via optical means, it is observed as a striped pattern in which different colors are disposed. In Japanese Patent Laid-Open No. 2008-015394, the colors and positions of the striped pattern are read and thereby it is determined the viewpoint image which is disposed at a position capable of being viewed from the front viewpoint. Further, the patterns of the images for alignment disposed at the top and bottom are matched with each other and thereby a relative slope between the synthesized image synthesized from the images for the different viewpoints and the optical means.

Japanese Patent Laid-Open No. 2009-162620 proposes an inspection apparatus for inspecting relative positional deviations of elements and accuracies of parts of a three-dimensional image reproduction apparatus.

FIG. 4 is a block diagram showing a configuration of the inspection apparatus described in Japanese Patent Laid-Open No. 2009-162620.

The inspection apparatus shown in FIG. 4 includes: three-dimensional image reproduction apparatus 500 including an optical element, such as pinhole array 509 (or lenticular sheet 512) and an aperture slit, and liquid crystal display 501; signal processing device 422 for causing three-dimensional image reproduction apparatus 500 to display a prescribed test pattern; photographing optical system 412 photographing the test pattern displayed on three-dimensional image reproduction apparatus 500; and analysis device 513 analyzing the taken inspection image.

Inspection apparatus shown in FIG. 4 causes liquid crystal display 501, where pixels are two-dimensionally arranged, to display the test pattern for switching on the pixels on a desired cycle, photographs the test pattern as an inspection image, analyzes the inspection image and thereby detects the relative positional deviation of the elements of the three-dimensional image reproduction apparatus. For instance, if the pixels are switched on at the positions of valleys of lenticular sheet 512 at a pitch of pixels substantially identical to the pitches of lenticular sheet 512, distribution of angles of edges capable of being displayed by respective lenses can be measured as image width W. The image with width W causes a positional deviation, if there is a relative positional deviation between lenticular sheet 512 and liquid crystal display 501. Accordingly, the amount of relative positional deviations of respective elements of the three-dimensional image reproduction apparatus can be detected by determining whether the amount of positional deviation of this image is within a prescribed reference value or not.

Japanese Patent Laid-Open No. 2009-223193 proposes a method for manufacturing a three-dimensional image display apparatus that photographs a position detection mark of a display panel and a lenticular lens and then detects relative positions of the display panel and the lenticular lens from the taken image.

FIG. 5 is a plan view showing an example of the taken image illustrated in Japanese Patent Laid-Open No. 2009-223193.

In Japanese Patent Laid-Open No. 2009-223193, position detection mark M1, such as an alignment mark, is provided at a peripheral region of the display panel so as enclose a display region, and a photographing region is set in region R1 including position detection mark M1 and an edge of lenticular lens 124a. FIG. 5 shows taken image G1 at this time. Art described in Japanese Patent Laid-Open No. 2009-223193 detects valley b1 of lenticular lens 124a from taken image G1, calculates deviation amount a1 in the x axis between position detection mark M1 and valley b1 and thereby detects relative positions of the display panel and the lenticular lens.

Japanese Patent Laid-Open No. 2010-019987 proposes an inspection apparatus for inspecting a three-dimensional image display apparatus, in which a display panel and a lenticular lens are fixed to each other, using an image for inspection.

FIG. 6 is a plan view showing an example of an image for inspection described in Japanese Patent Laid-Open No. 2010-019987.

In Japanese Patent Laid-Open No. 2010-019987, pixels disposed at the center of lens pitch P for each lens pitch P of the lenticular lens are switched on in a line, and an image including two position detection marks M1 and M2 on a line orthogonal to a pixel array is used as image for inspection G1. Image for inspection G1 is displayed on a display apparatus, inspection regions (e.g., 3×3=9 points) to be inspected are photographed, luminance distributions are acquired from the respective taken images, and thereby the deviation amount in a horizontal direction is detected.

Japanese Patent Laid-Open No. 2009-300816 proposes a manufacturing method and manufacturing apparatus that correctly align a display panel of a display apparatus providing different images in observation regions with a light travel controller.

FIG. 7 is a schematic diagram showing a manufacturing apparatus illustrated in Japanese Patent Laid-Open No. 2009-300816.

The manufacturing apparatus shown in FIG. 7 includes a display apparatus for displaying different images in eight observation regions Ob, and cameras 240*a* and 240*b* disposed in prescribed observation regions Ob. In Japanese Patent Laid-Open No. 2009-300816, the display apparatus and cameras 240*a* and 240*b* are arranged as shown in FIG. 7, and the light travel controller is aligned with respect to the display panel so as to reduce the difference between images actually taken by cameras 240*a* and 240*b* disposed in the prescribed observation regions and images to be taken by these cameras, thereby bringing an image to be viewed by an actual observer close to the optimal image.

However, the aforementioned related arts have problems described as follows.

The art described in Japanese Patent Laid-Open No. 2007-65441 only describes a method for deriving arrangement lens specifications. Even with adjustment of an angle of the parallel line group, separation adjustment, and adjustment of the horizontal reference position, this art is incapable of preventing the reverse view phenomenon in which right and left images at respective viewpoints are replaced with each other. Further, since a drawing process of the parallel line group and a controller used for adjustment thereof are required, the cost of the inspection apparatus is increased and operation time is also increased.

The art described in Japanese Patent Laid-Open No. 2006-79097 adjusts the black band, which is formed between image windows for right and left eyes, to a prescribed position. For instance, it is adjusted such that the black band is disposed at the center of the panel. However, even if the position of the black band is disposed at the center of the panel, it is also determined that there is no positional deviation if the three-dimensional image forming apparatus (optical means) is relatively inclined with respect to the image panel. That is, the art described in Japanese Patent Laid-Open No. 2006-79097 is incapable of detecting a relative slope between the image panel and the three-dimensional image forming apparatus (optical means). Further, the art described in Japanese Patent Laid-Open No. 2006-79097 has at least three view points and, in a case of inspecting an image panel whose number of viewpoints is odd, is incapable of displaying an image different in bilateral symmetricalness with respect to the displayed center. Accordingly, there is a problem that this art is incapable of inspecting this image panel.

According to the art described in Japanese Patent Laid-Open No. 2008-015394, the top and bottom parts of the synthesized image for arranging the alignment image are out of the display region. Even if there is an abnormality in the stereoscopic view formed by the synthesized image, the art cannot perform inspection. There is another problem in that, only with the colors and arrangement of stripes, the relative position between the alignment image and the lenticular lens can only be inspected one viewpoint at a time. There is still another problem in that a process of cutting the part where the alignment image is disposed is separately required. This increases the manufacturing cost and manufacturing time.

According to the art described in Japanese Patent Laid-Open No. 2009-162620, in a case where the number of viewpoints is two, with the test pattern switching on the column disposed in the valley of a lens pitch, the entire screen of the display apparatus is switched on. Accordingly, there is a problem in that the relative positional deviation of the display panel and the optical means cannot be read and inspection cannot be performed.

The art described in Japanese Patent Laid-Open No. 2009-223193 reads physical positions of the position detection mark of the display panel and the lenticular lens as they are, and detects the positional accuracy. Accordingly, in order to secure a required accuracy, high performance photographing means is required. Further, it is difficult to image the display panel and the lenticular lens at the same focus. Accordingly, there is a problem in that a certain amount of inspection time and expensive apparatus are required. Further, only local information at and around the mark is acquired. Accordingly, it is difficult to acquire information of the entire screen. For instance, in a case where the lenticular lens at a non-photographing part has an average distortion, detection is not easy.

The art described in Japanese Patent Laid-Open No. 2010-019987 is a method of inspection on each lens pitch P. In order to acquire information of the entire screen, inspection regions are required. Further, there is a problem in that, since the luminance distribution of the taken image of each inspection region is calculated, a certain amount of inspection time is required.

The art described in Japanese Patent Laid-Open No. 2009-300816 aligns the light travel controller with the display panel on the basis of images corresponding to respective observation regions. Accordingly, this art requires cameras for photographing an image of at least two of observation regions, or a special camera for photographing an image of the observation regions at one time. This increases the cost of the manufacturing apparatus.

SUMMARY

Thus, it is an object of the present invention to provide a mounting accuracy inspection method capable of detecting the relative positional accuracy between a display panel and optical means at low cost and high speed, and an inspection apparatus using the inspection method.

In order to attain the object, a mounting accuracy inspection method according to an exemplary aspect of the present invention is a method for inspecting positional accuracy between a display panel in which pixel groups are arranged and optical means for providing image display for N viewpoints (N is a natural number more than one) from the pixel groups, the display panel and the optical means being included in a display apparatus, including:

a displaying step displaying a test pattern including image signals different in the respective viewpoints, on the display apparatus; and an extracting step adopting the image displayed on the display apparatus as an inspection image, and extracting a slope and a position of a boundary line segment between the viewpoints from the inspection image.

Another method according to an exemplary aspect of the present invention is a mounting accuracy inspection method for inspecting positional accuracy between a display panel in which pixel groups are arranged and optical means for providing image display for N viewpoints (N is a natural number more than one) from the pixel groups, the display panel and the optical means being included in a display apparatus, including:

a displaying step displaying a test pattern including image signals different in the respective viewpoints, on the display apparatus;

a photographing step photographing the display at a prescribed photographing distance by photographing means, and thus acquiring an inspection image; and an extracting step extracting a slope and a position of a boundary line segment between the viewpoints from the inspection image.

An inspection apparatus according to an exemplary aspect of the present invention is an apparatus for inspecting positional accuracy between a display panel in which pixel groups are arranged and optical means for providing image display for N viewpoints (N is a natural number more than one) from the pixel groups in a display apparatus including the display panel and the optical means, including:

an image output device outputting a test pattern including image signals different in the respective viewpoints on the display apparatus; and an extraction device extracting a slope and a position of a boundary line segment of an inspection image displayed on the display apparatus, wherein the apparatus detects the positional accuracy between the display panel and the optical means on the basis of the slope and the position extracted by the extraction device.

Another apparatus according to an exemplary aspect of the present invention is an inspection apparatus for inspecting positional accuracy between a display panel in which pixel groups are arranged and optical means for providing an image display for N viewpoints (N is a natural number more than one) from the pixel groups in a display apparatus including the display panel and the optical means, including:

an image output device outputting a test pattern including image signals different in the respective viewpoints on the display apparatus; and a photographing device photographing a boundary line segment appearing when the test pattern is displayed; and an extraction device extracting a slope and a position of the boundary line segment in an inspection image taken by the photographing device, wherein the apparatus detects the positional accuracy between the display panel and the optical means on the basis of the slope and the position extracted by the extraction device.

BRIEF DESCRIPTION OF THE DRAWINGS

FIGS. 9A and 9B are diagrams showing an inspection principle of the first exemplary embodiment; FIG. 9A is a schematic diagram showing an example of a test pattern displayed on a display apparatus; FIG. 9B is a schematic diagram showing an example of an inspection image acquired from photographing means;

EXEMPLARY EMBODIMENT

The present invention will hereinafter be described using the diagrams.

(First Exemplary Embodiment)

A method (mounting accuracy inspection method) of inspecting the relative positional accuracy between a display panel and optical means of an exemplary embodiment of the present invention will hereinafter be described. Note that the identical elements are assigned with the identical symbols, and redundant description is omitted.

Figure 1:
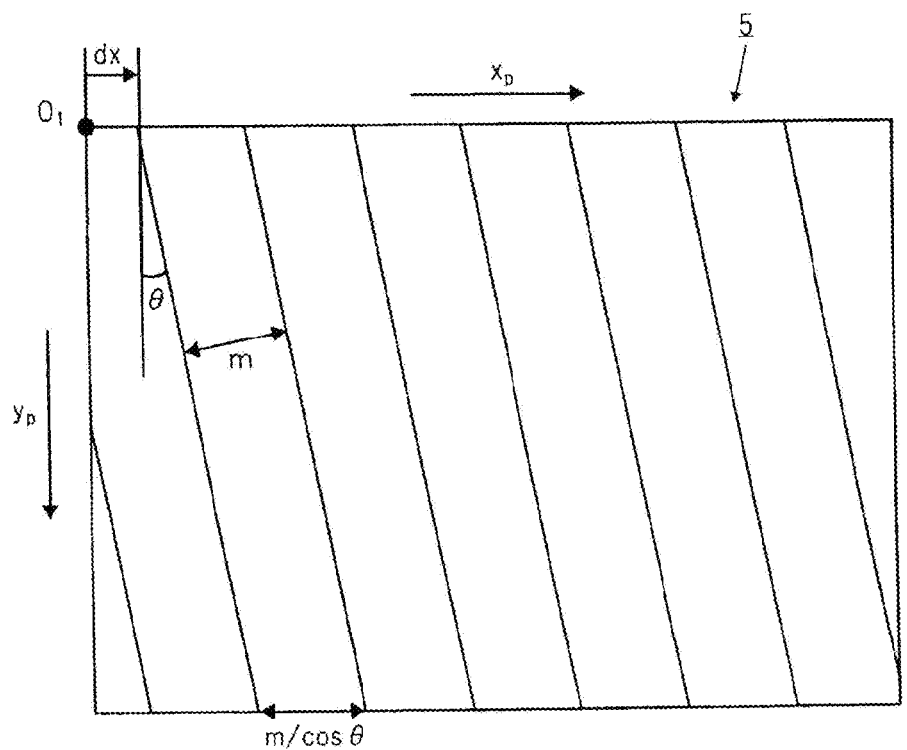
FIG. 1 is a schematic diagram showing an example of an inspection image displayed on a display apparatus disclosed in Japanese Patent Laid-Open No. 2007-65441.
Figure 2:
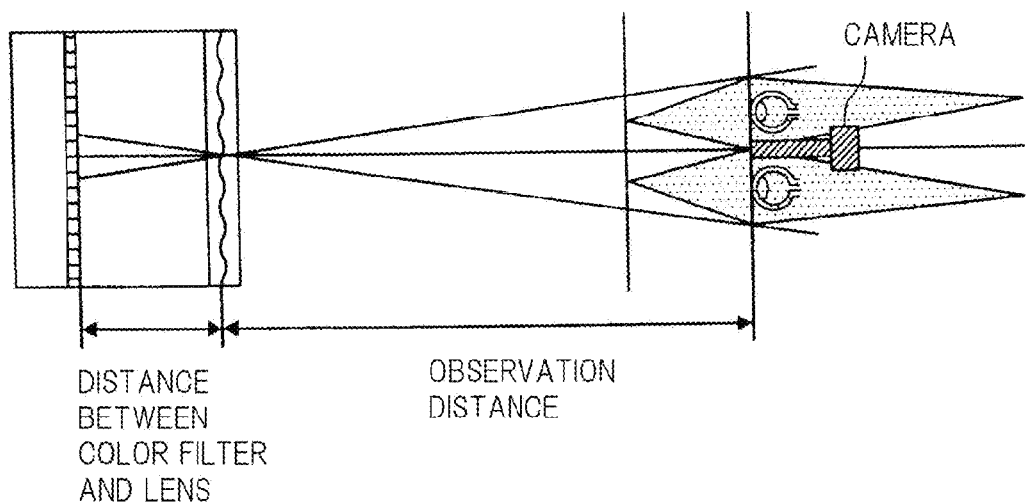
FIG. 2 is a schematic diagram showing a principle of checking lens mounting accuracy described in Japanese Patent Laid-Open No. 2006-79097.
Figure 3:
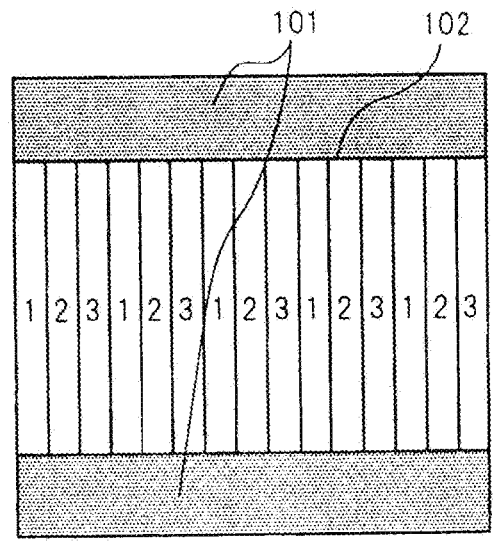
FIG. 3 is a schematic diagram showing an image for alignment described in Japanese Patent Laid-Open No. 2008-015394.
Figure 4:
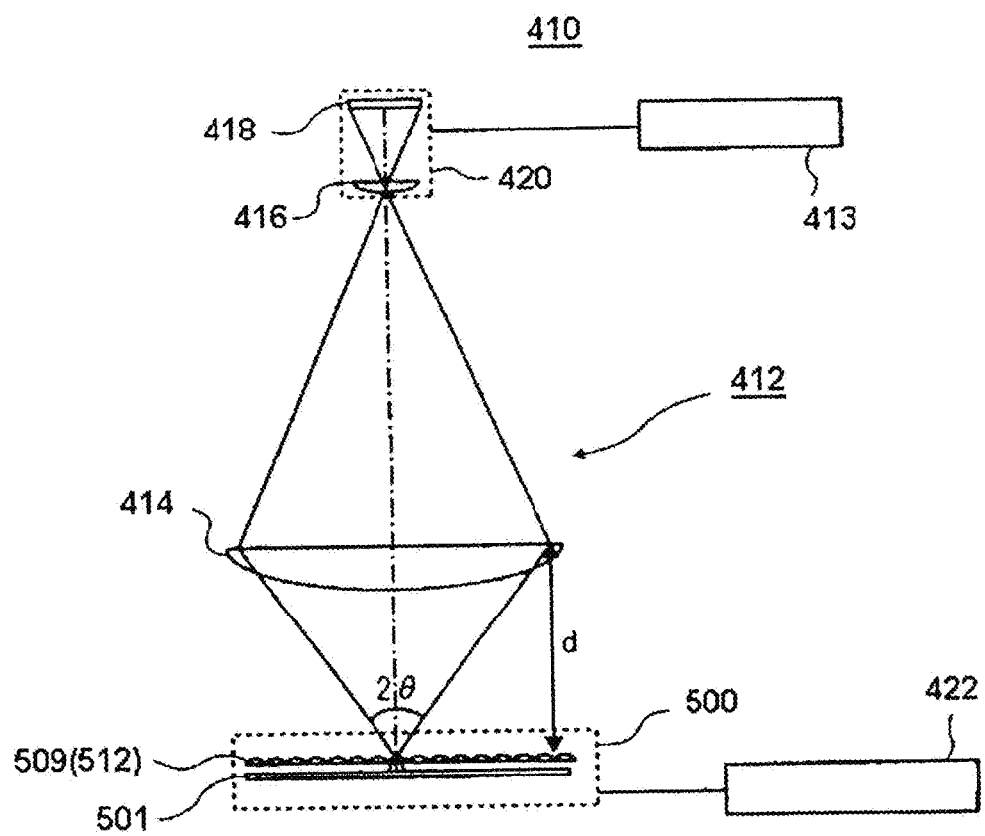
FIG. 4 is a block diagram showing a configuration of an inspection apparatus described in Japanese Patent Laid-Open No. 2009-162620.
Figure 5:
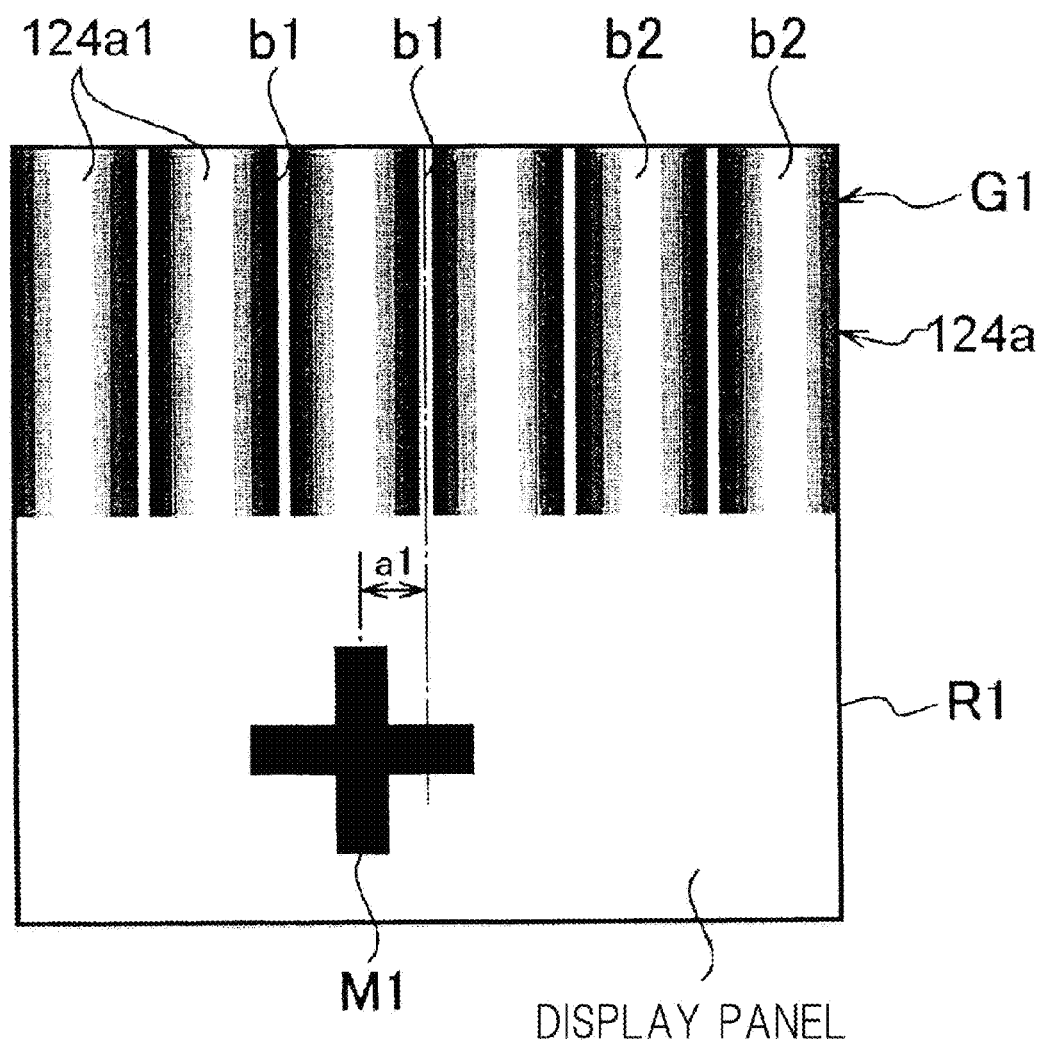
FIG. 5 is a plan view showing an example of a taken image illustrated in Japanese Patent Laid-Open No. 2009-223193.
Figure 6:
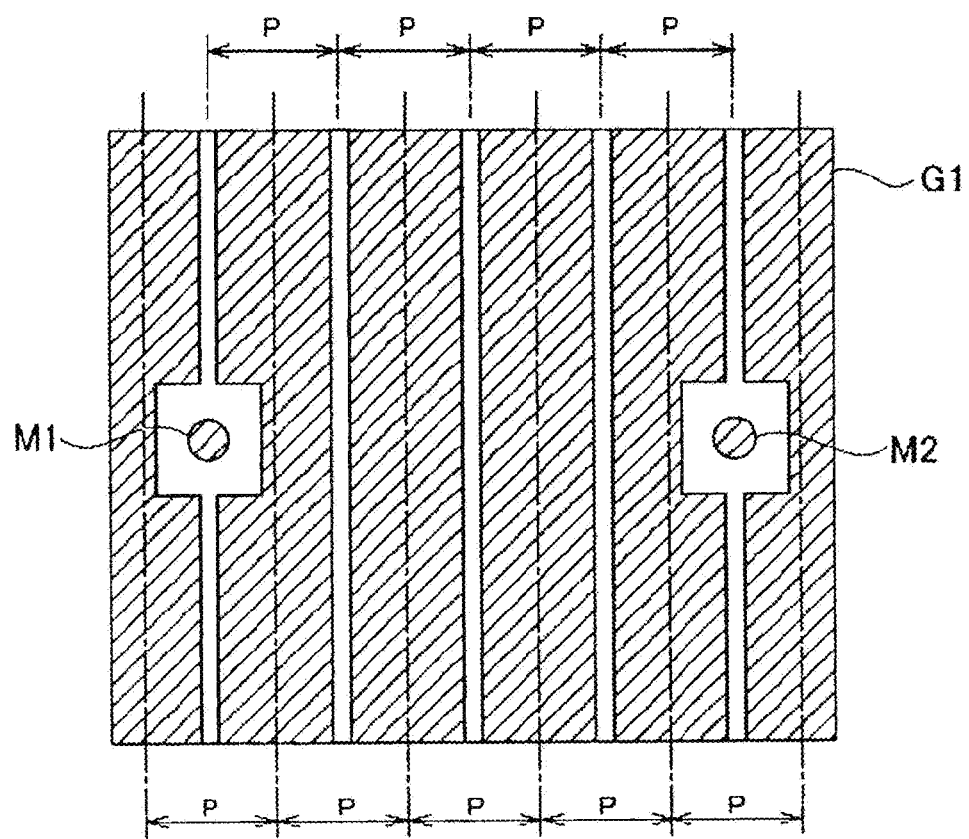
FIG. 6 is a plan view showing an example of an image for inspection described in Japanese Patent Laid-Open No. 2010-019987.
Figure 7:
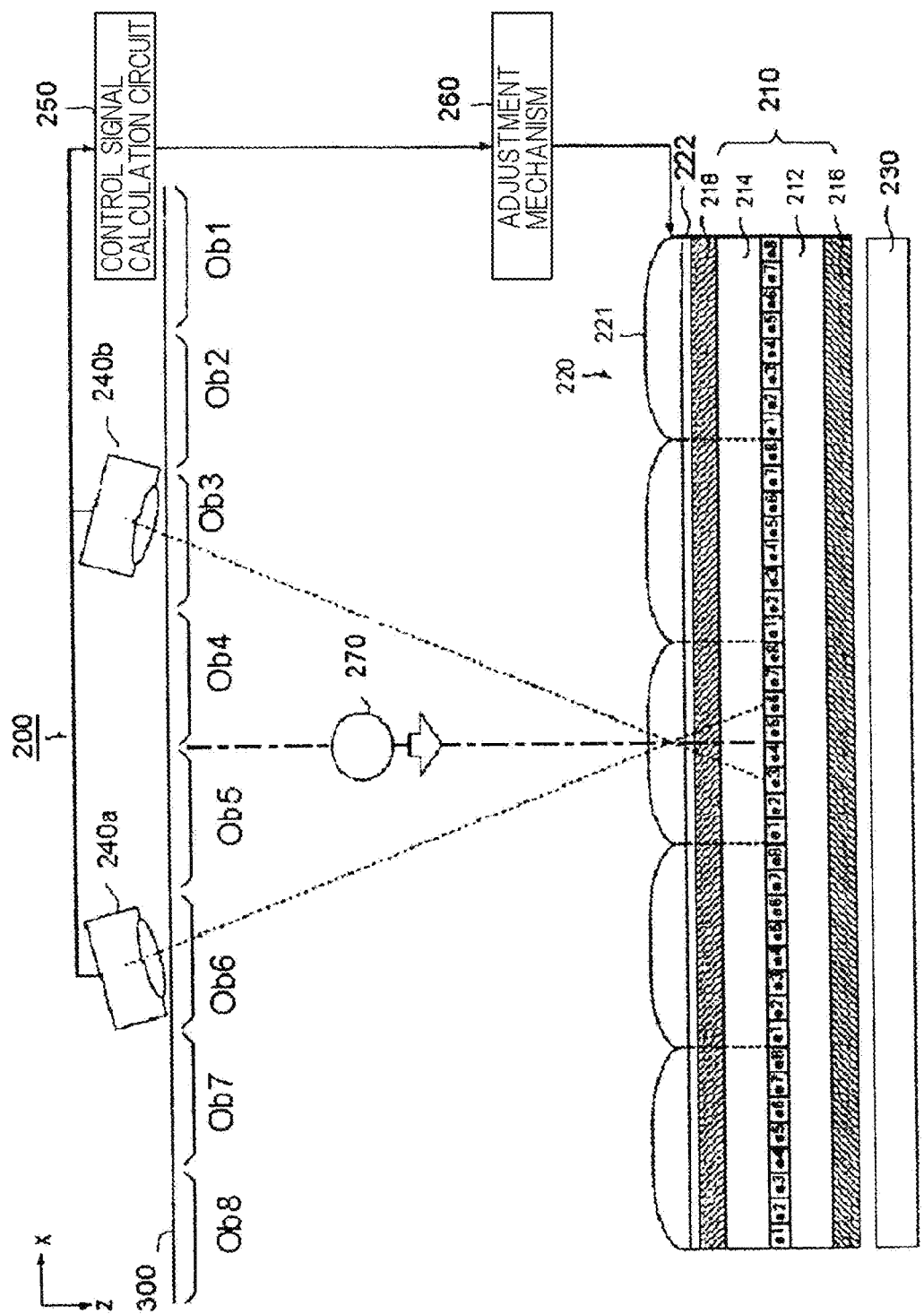
FIG. 7 is a schematic diagram showing a manufacturing apparatus illustrated in Japanese Patent Laid-Open No. 2009-300816.
Figure 8:
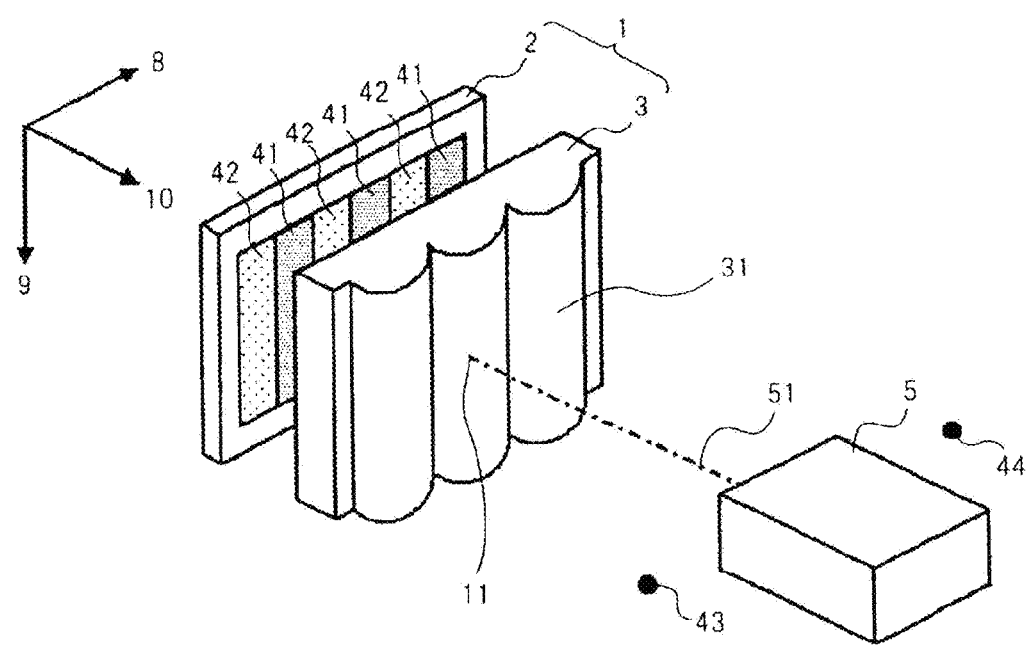
FIG. 8 is a schematic diagram showing an example of arrangement of a display apparatus and photographing means used for an inspection method of a first exemplary embodiment.

FIG. 8 is a schematic diagram showing an example of arrangement of a display apparatus and photographing means used for an inspection method of a first exemplary embodiment.

As shown in FIG. 8, display apparatus 1 includes display panel 2 in which pixel groups are arranged, and optical means 3 for forming at least two viewpoint images from the pixel groups. The separation between display panel 2 and optical means 3 are appropriately arranged to form the viewpoint images. Photographing means 5 are arranged at a position for photographing a display screen of display apparatus 1. In this exemplary embodiment, a prescribed test pattern displayed on display apparatus 1 is photographed by photographing means 5, the relative positional accuracy between display panel 2 of display apparatus 1 and optical means 3 is detected on the basis of the inspection image photographed by photographing means 5.

On display panel 2, pixels 41 for a first viewpoint for displaying an image for the first viewpoint and pixels 42 for a second viewpoint for displaying an image for the second viewpoint are alternately arranged along first direction 8. FIG. 8 shows position 43 of the left eye and position 44 of the right eye of an observer.

This exemplary embodiment adopts, for instance, a lenticular lens as optical means 3. The lenticular lens has a configuration in which one surface thereof opposite to display panel 2 is a plane, and cylindrical lenses 31, or half-cylindrical lens elements, are arranged on the other surface.

Display panel 2 and the lenticular lens are fixedly cemented to each other at a position where a pair of pixel groups including pixels 41 for the first viewpoint and pixels 42 for the second viewpoint corresponds to one cylindrical lens 31. Note that, although FIG. 8 shows an example where the lens surface side (half-cylindrical side) of the lenticular lens is a display screen, the plane side of the lenticular lens may be the display screen.

In this specification, Cartesian coordinates including the following xyz axes are set in a space including display apparatus 1 and photographing means 5.

The direction along which aforementioned pixels 41 for the first viewpoint and pixels 42 for the second viewpoint are arranged, or first direction 8, is x axis. The direction indicated by the arrow in the figure is a positive direction. Second direction 9 orthogonal to first direction 8 is y axis. The direction indicated by the arrow in the figure is a positive direction. Further, third direction 10 orthogonal to both x and y axes is z axis. The direction indicated by the arrow in the figure is a positive direction. In this case, the +z direction is the direction from display panel 2 to the observer. The observer views a display screen on the +z side of display apparatus 1.

In such display panel 2, cylindrical lenses 31 are arranged in the x axis direction. Accordingly, an image for left eye and an image for right eye are separated in the x axis direction and displayed independently. Each pixel group including pixels 41 for the first viewpoint and pixels 42 for the second viewpoint has a shape elongated in the y axis direction. The arrangement period of the pixel group in the x axis direction is substantially identical to that of the cylindrical lenses. Accordingly, cylindrical lenses 31 are arranged corresponding to the respective pixel groups. The lenticular lens is fixed on display panel 2 such that the center of the lenticular lens matches with that of display panel 2.

According to such a configuration, light emitted from pixels 41 for the first viewpoint is refracted by the lenticular lens, and reaches first viewpoint position 43. Likewise, light emitted from pixels 42 for the second viewpoint is refracted by the lenticular lens and reaches second viewpoint position 44. Accordingly, for instance, the observer whose left and right eyes are disposed at the first and second viewpoints, respectively, can view a satisfactory stereoscopic image with stereoscopic effect.

A lens system for image processing, a typical video camera, a digital camera or the like is adopted as photographing means 5. Photographing means 5 is fixed at a position in the +z direction with respect to display apparatus 1 whose focus is in proximity of the display screen of display panel 2. Photographing center 51 of photographing means 5 matches with center 11 of display apparatus 1. Ideally speaking, photographing center 51 is disposed between first and second viewpoint positions 43 and 44.

FIGS. 9A and 9B are diagrams showing an inspection principle of the first exemplary embodiment. FIG. 9A is a schematic diagram showing an example of a test pattern displayed on the display apparatus. FIG. 9B is a schematic diagram showing an example of the inspection image acquired from the photographing means.

As shown in FIG. 9A, test pattern 7 includes, for instance, first pattern 7A for the first viewpoint and second pattern 7B for the second viewpoint.

In first and second patterns 7A and 7B, each of the entire patterns are set to prescribed colors or gradation values, and first and second patterns 7A are 7B different in color or gradation value from each other. For instance, first pattern 7A is perfect white whose gradation value is the maximum value, and second pattern 7B is perfect black whose gradation level is the minimum. Instead, different colors may be set such that first pattern 7A is perfect red, and second pattern 7B is perfect blue.

Test pattern 7 is not limited to a form in which two patterns are displayed in a manner laterally adjacent to each other in FIG. 9A. Instead, a form in which two adjacent patterns are displayed in the top-and-bottom direction may be adopted. In a case where the number of viewpoints is at least three, a form in which the patterns are displayed corresponding to the number of viewpoints in a manner adjacent to each other in the lateral or top-and-bottom direction may be adopted. A form in which the first and second patterns are separately divided may be adopted. That is, various forms may be adopted according to display apparatus 1.

FIG. 9B shows a displayed image, when test pattern 7 shown in FIG. 9A is displayed on display apparatus 1, in a case where the relative slope or the horizontal positional deviation is between display panel 2 and optical means 3. That is, FIG. 9B shows an example of an image (inspection image 73) taken by photographing means 5, under such situations.

As described above, first and second patterns 7A and 7B of test pattern 7 have different colors or gradation values. Accordingly, there are first and second image regions 75 and 76 corresponding to first and second patterns 7A and 7B, respectively, in inspection image 73. Boundary line segment 74 appears on the boundary therebetween. The center of the boundary line segment 74 moves by Δx from inspection image center 71 according to the amount of positional deviation between display panel 2 and optical means 3.

In a case with no positional deviation between display panel 2 and optical means 3 at all, light from the pixels for the first viewpoint and light from the pixels for the second viewpoint are separated equally. Accordingly, position Δx of boundary line segment 74 between first and second image regions 75 and 76 becomes 0. However, in a case where optical means 3 has a positional deviation with respect to display panel 2, light from the pixels for the first viewpoint and light from the pixels for the second viewpoint are separated into first and second image regions 75 and 76 according to the amount of positional deviation. Boundary line segment 74 thus appears at position Δx deviated from inspection image center 71.

In a case where optical means 3 is fixed with inclination to display panel 2, that is a case of occurrence of rotational deviation, light from pixels for the first viewpoint and light from pixels for the second viewpoint are separated into first and second image regions 75 and 76 according to the rotational deviation, thereby producing boundary line segment 74 having a slope with respect to the vertical side in inspection image 7. That is, as shown in FIG. 9B, boundary line segment 74 having slope θ and position (deviation) Δx appears in inspection image 73 according to positional relationship between display panel 2 and optical means 3.

Accordingly, the relative positional accuracy between display panel 2 and optical means 3 can be detected by displaying test pattern 7 on display apparatus 1, photographing the display screen of display apparatus 1 with photographing means 5, and detecting slope θ and position Δx of boundary line segment 74 in inspection image 73 acquired from photographing means 5.

This exemplary embodiment illustrates an example in which display apparatus 1 includes pixels for two viewpoints. In a case where display apparatus 1 includes pixels for multi-viewpoints, cylindrical lenses 31 of lenticular lens 3 may be arranged so as to support respective pixel groups including pixels 41 for the first to N viewpoints (N is a natural number more than one). Provided that display apparatus 1 includes pixels for multi-viewpoints, the boundary line segment to be detected is different for a case where N is even or odd. This point will hereinafter be described using FIGS. 10 and 11.

Figure 10:
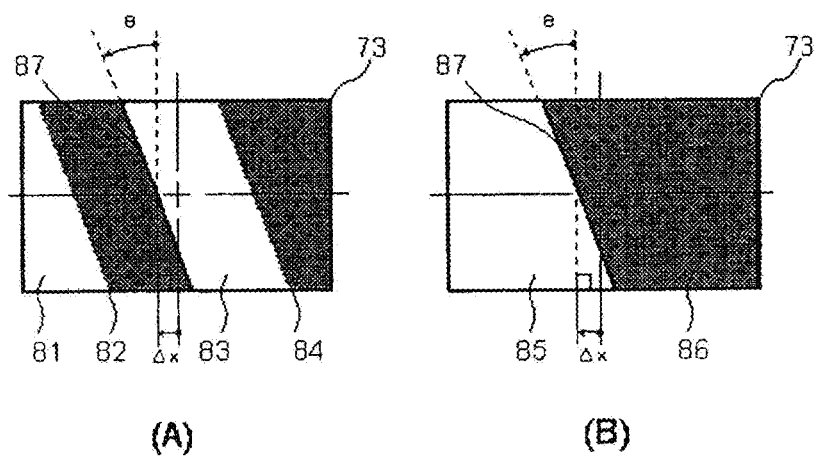
FIG. 10 is a schematic diagram showing an example of an inspection image acquired from a display apparatus including pixels for N viewpoints in a case where N is an even number (N=4)

FIG. 10 is a schematic diagram showing an example of an inspection image acquired from a display apparatus including pixels for N viewpoints in a case where N is an even number (N=4).

FIG. 10A shows an example of inspection image 73 in a case where a first pattern (here, perfect white) is displayed on pixels for odd-numbered viewpoints from first to (N−1)-th viewpoints and a second pattern (here, perfect black) having a color or gradation value different from that of the first pattern is displayed on pixels for even-numbered viewpoints from second to N-th viewpoints as test pattern 7.

Inspection image 73 shown in FIG. 10A includes first image region 81 in which a first pattern corresponding to pixels for a first viewpoint is displayed, second image region 82 in which a second pattern corresponding to pixels for a second viewpoint is displayed, third image region 83 in which the first pattern corresponding to pixels for a third viewpoint is displayed, and fourth image region 84 in which the second pattern corresponding to pixels for a fourth viewpoint is displayed.

As described above, the pixels for odd-numbered viewpoints and the pixels for even-numbered viewpoints are different in color or gradation value to display from each other. Accordingly, in inspection image 73 shown in FIG. 10A, boundary line segments appear between pixels for the viewpoints.

In this case, the relative positional accuracy between display panel 2 and optical means 3 may be acquired by detecting slope θ and position Δx of boundary line segment 87 using boundary line segment 87 around the center of inspection image 73 as the representative value of the boundary line segments. FIG. 10A shows an example in which the boundary line segment is produced using two patterns. Instead, the maximum of N patterns with different colors or gradation values may be displayed on pixels for the first to N-th viewpoints. That is, only in the case in which there are different colors or gradation values of patterns to be displayed on pixels for adjacent viewpoints, can any type of image be adopted as the test pattern.

FIG. 10B shows an example of inspection image 73 in which a first pattern (here, perfect white) is displayed on pixels for first to (N/2)-th viewpoints as a first viewpoint group and a second pattern (here, perfect black) is displayed on pixels for (N/2+1)-th to Nth viewpoints as a second viewpoint group.

According to this test pattern, in inspection image 73 shown in FIG. 10B, first image region 85 in which the first pattern corresponding to the first viewpoint group and a second image region 86 in which the second pattern corresponding to the second viewpoint group appear. In this case, slope θ and position Δx of boundary line segment 87 between the image regions may be detected.

Use of such a test pattern allows slope θ and position Δx of the boundary line segment to be easily acquired even with a configuration including pixels for multi-viewpoints. As with the inspection image shown in FIG. 9B, boundary line segment 87 can be acquired. Accordingly, this has an advantage that allows algorithms for detecting slope θ and position Δx of boundary line segment 87 to be uniform.

Figure 11:
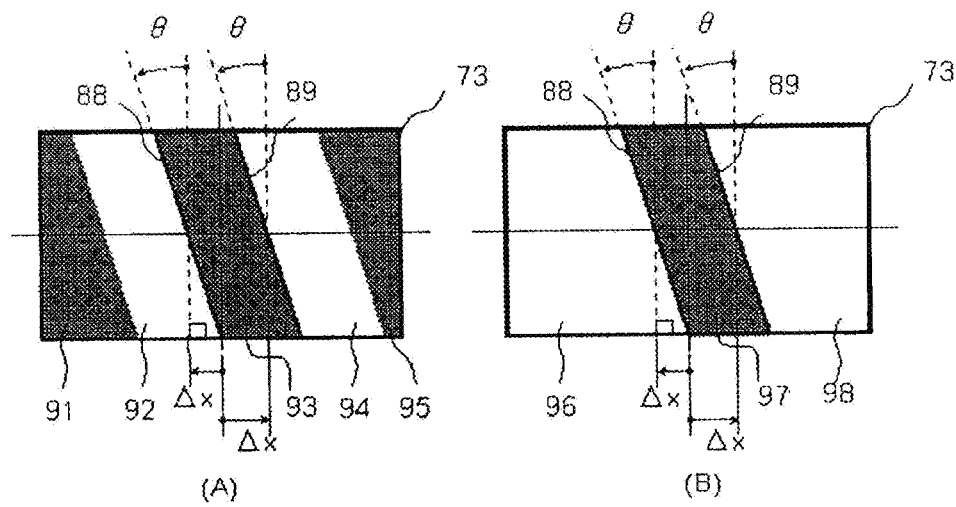
FIG. 11 is a schematic diagram showing an example of an inspection image acquired from a display apparatus including pixels for N viewpoints in a case where N is an odd number (N=5)

FIG. 11 is a schematic diagram showing an example of an inspection image acquired from a display apparatus including pixels for N viewpoints in a case where N is an odd number (N=5).

FIG. 11A shows an example of inspection image 73 in a case where a first pattern (here, perfect black) is displayed on pixels for odd-numbered viewpoints from first to N-th viewpoints and a second pattern (here, perfect white) is displayed on pixels for even-numbered viewpoints from second to (N−1)-th viewpoints as test pattern 7.

Inspection image 73 shown in FIG. 11A includes first image region 91 in which the first pattern is displayed corresponding to the pixels for the first viewpoint, second image region 92 in which the second pattern is displayed corresponding to the pixels for the second viewpoint, third image region 93 in which the first pattern is displayed corresponding to the pixels for the third viewpoint, fourth image region 94 in which the second pattern is displayed corresponding to the pixels for the fourth viewpoint, and fifth image region 95 in which the first pattern is displayed corresponding to the pixels for fifth viewpoint.

As described above, the pixels for the odd-numbered viewpoints and the pixels for the even-numbered viewpoints are different as regards the color or gradation value of the patterns to be displayed. Accordingly, in inspection image 73 shown in FIG. 11A, boundary line segments appear between pixels for the viewpoints.

In this case, boundary line segments 88 and 89 in proximity of the center of inspection image 73 may be used as representative values of boundary line segments, slopes θ and positions Δx of boundary line segments 88 and 89 are detected, and the average value thereof may be calculated. FIG. 11A shows an example in which two patterns are used to produce the boundary line segments. Instead, N patterns at the maximum with different colors or gradation values may be displayed on pixels for the first to N-th viewpoints. That is, only in the case in which there are different colors or gradation values of the patterns to be displayed on the pixels for adjacent viewpoints, can any type of image be adopted as the test pattern. Note that, in a case where N is an odd number, $\Delta x=0$ is not satisfied.

FIG. 11B shows inspection image 73 in which a first pattern (here, perfect black) is displayed as a first viewpoint group on pixels for ((N+1)/2)-th viewpoints and a second pattern (here, perfect white) is displayed as a second viewpoint group on pixels for the other viewpoints.

According to this test pattern, inspection image 73 shown in FIG. 11B includes first and third image regions 96 and 98 in which the first pattern is displayed corresponding to the first viewpoint group and second image region 97 in which the second pattern is displayed corresponding to the second viewpoint group. In this case, slopes $\theta$ and positions $\Delta x$ of boundary line segments 88 and 89 between image regions may be detected, and the average value thereof may be calculated.

Use of such a test pattern allows slope $\theta$ and position $\Delta x$ of boundary line segment to be easily acquired even in a case where display apparatus 1 includes pixels for viewpoints. Note that, in a case where N is an odd number, $\Delta x=0$ is not satisfied.

Figure 12:
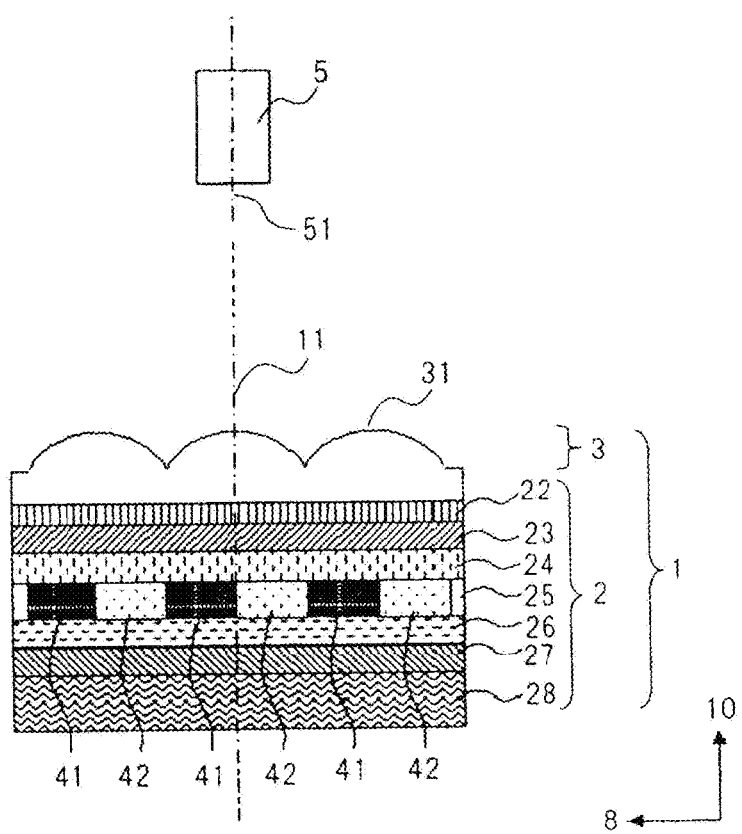
FIG. 12 is a sectional view showing an example of a configuration of a display apparatus including pixels for two viewpoints.

Here, FIG. 12 shows an example in which a transmission liquid crystal display panel including pixels for two viewpoints is adopted as display apparatus 1.

FIG. 12 is a sectional view showing an example of a configuration of a display apparatus including pixels for two viewpoints.

Display panel 2 of display apparatus 1 shown in FIG. 12 has a configuration including backlight 28, first optical film 27, first substrate 26, liquid crystal layer 25, second substrate 24 and second optical film 23.

First substrate 26 has a configuration in which pixels including switching elements such as TFTs are provided and pixels 41 for the first viewpoint and pixels 42 for second viewpoint are alternately arranged in x direction 8. Second substrate 24 is provided with color filters of red (R), green (G) and blue (B) arranged in stripes.

First and second optical films 27 and 23 are a polarizing plate or a compensating plate. First optical film 27 is attached on first substrate 26. Second optical film 23 is attached on second substrate 24.

Any type of display element, such as a display element other than a liquid crystal display element, for instance, an organic EL, an inorganic EL, a plasma display panel, a field emission element and a CRT, may be adopted as display panel 2. A method for driving display panel 2 may be an active matrix system using TFTs and the like, or a passive matrix system.

The aforementioned lenticular lens 3 is adopted as optical means 3. Optical means 3 is fixed to display panel 2 via adhesive layer 22 such that one cylindrical lens 31 is disposed to support a pair of pixels 41 for the first viewpoint and pixels 42 for the second viewpoint.

Optical means 3 is not limited to lenticular lens 3. Instead, any optical element that separates light, such as a fry eye lens, a parallax barrier and a prism sheet, may be adopted as optical means 3. Further, for instance, a GRIN (Gradient Index) lens using liquid crystal, a liquid crystal lens including a convex and concave substrate having a lens effect and liquid crystal molecules, a switching parallax barrier using liquid crystal may be adopted as optical means 3.

In a case of adopting a lens-like element as optical means 3, optical means 3 is disposed on a display screen side (+z direction) of display panel 2. In a case of adopting a barrier-like element as optical means 3, optical means 3 can be disposed on display screen side (+z direction) or rear side (−z direction) of display panel 2. Further, optical film and the like including optical elements separating light emitted from backlight for right and left eyes in a time division manner may be adopted as optical means 3. In this case, the optical film may be disposed on the rear side (−z direction) of display panel 2. Even in a case of adopting these element as optical means 3, the relative positional accuracy between display panel 2 and optical means 3 can be acquired by detecting slope $\theta$ and position $\Delta x$ of the boundary line segment in aforementioned inspection image 73.

The above description illustrates an example of setting the same color or gradation value in the entire region in each of first and second patterns 7A and 7B. Instead, for instance, gradation patterns in which the color or gradation value varies in a desired direction may be adopted as first and second patterns 7A and 7B. Various images may be adopted including different images in the pattern. Any image according to which boundary line segment 74 can be extracted from inspection image 73 may be adopted as test pattern 7.

As described above, according to the first exemplary embodiment, the relative positional accuracy between display panel 2 and optical means 3 can be acquired by detecting slope $\theta$ and position $\Delta x$ of the boundary line segment in inspection image 73. A typical video camera, a digital camera or the like may be adopted as photographing means 5. It is not necessarily to adopt cameras or a special camera. Accordingly, the cost of the inspection apparatus is not increased. Further, slope $\theta$ and position $\Delta x$ of boundary line segment 73 can easily be acquired without complicated processing. Accordingly, the relative positional accuracy between display panel 2 and optical means 3 can be detected at high speed (in short processing time). Therefore, the relative positional accuracy between the display panel and the optical means can be detected at low cost and at high speed.

Examples of the first exemplary embodiment will hereinafter be described using the diagrams. In following First to Third Examples, description will be made with examples where display apparatus 1 includes pixels for two viewpoints. However, these Examples can be applied to configurations having at least three viewpoints.

First Example

Figure 13:
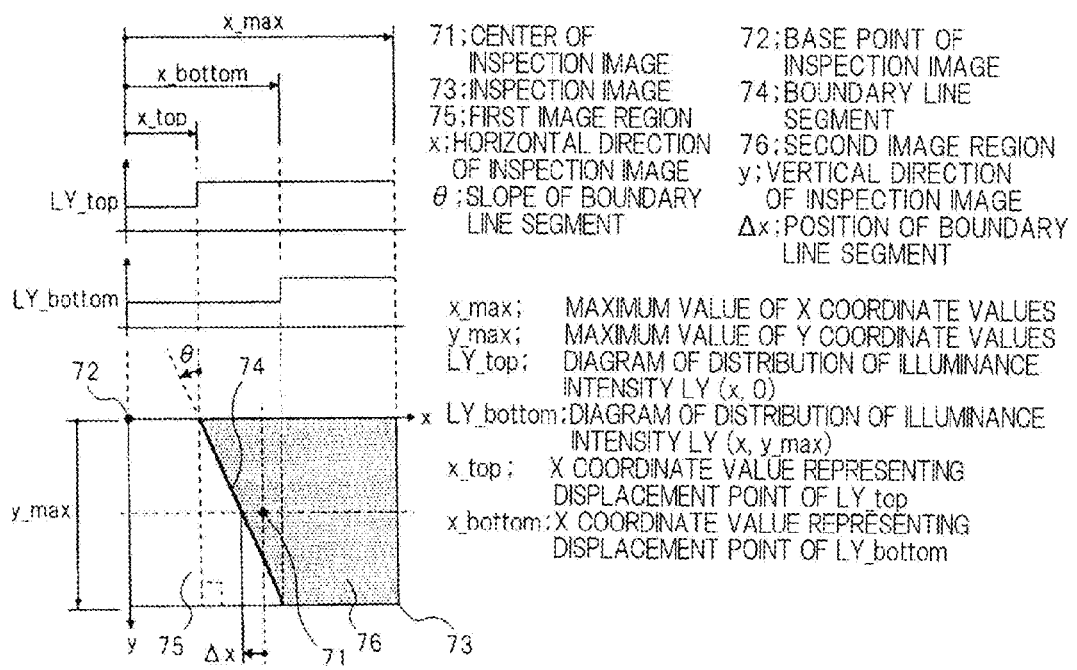
FIG. 13 is a schematic diagram showing an example of an inspection image acquired by an inspection method of a First Example.
Figure 14:
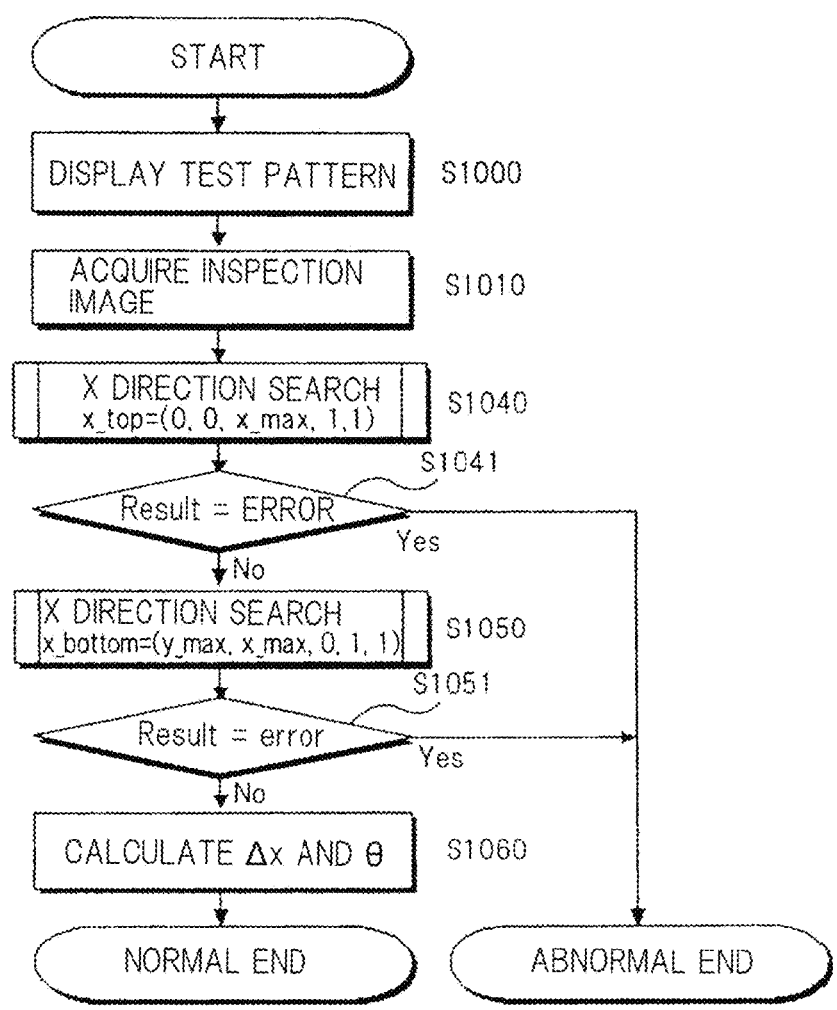
FIG. 14 is a flowchart showing a processing procedure for extracting slope $\theta$ and position $\Delta x$ of a boundary line segment from the inspection image shown in FIG. 13.

FIG. 13 is a schematic diagram showing an example of an inspection image acquired by an inspection method of a First Example. FIG. 14 is a flowchart showing a processing procedure for extracting slope $\theta$ and position $\Delta x$ of a boundary line segment from the inspection image shown in FIG. 13.

FIG. 13 shows inspection image 73 acquired by photographing means 5 in a case of displaying a first pattern of perfect white on pixels for a first viewpoint and displaying a second pattern of perfect black on pixels for a second viewpoint, and various types of data generated through a process of calculating slope $\theta$ and position $\Delta x$ of boundary line segment 74 from inspection image 73. Note that, as to intensities of luminance of first and second image regions 75 and 76 of inspection image 73, the relationship is satisfied in that first image region 75>second image region 76.

In inspection image 73 shown in FIG. 13, the top left corner of the image is regarded as base point 72 and the x-y coordinate system is applied thereto, and thus each position in inspection image 73 can be represented as coordinates (x, y). Here, the coordinates of inspection image center 71 are defined as (x.center, y.center), the coordinates of the right bottom corner of the image farthest from base point 72 are defined as (x.max, y.max). The coordinates of base point 72 are (0, 0).

In an image memory (not shown) included in display apparatus 1, a value of luminance LY (x, y) corresponding to the coordinate position is stored as an image data of inspection image 73. LY.top shown in FIG. 13 represents the distribution of luminance LY (x, 0) for x=0 to x.max, and LY.bottom represents the distribution of luminance LY(x, y.max) for x=0 to x.max. In FIG. 13, the x coordinate value of the displacement point on LY.top is defined as x.top, and the x coordinate value of the displacement point on LY.bottom is defined as x.bottom.

Next, a procedure for extracting slope θ and position Δx of boundary line segment 74 will be described using FIG. 14.

As shown in FIG. 14, in a process of extracting slope θ and position Δx of boundary line segment 74, first, test pattern 7 is displayed on display apparatus 1 (step S1000), an image of the display screen of display apparatus 1 is generated by photographing means 5, and an image data of inspection image 73 including boundary line segment 74 is acquired from photographing means 5 (step S1010).

Next, in order to determine the displacement point x.top on LY.top, the value of luminance LY(x, 0) is searched from the image data of inspection image 73 in a region x=0 to x.max (x direction search). In the search process in the x direction on LY.top, values of "0", "0", "x.max", "1" and "1" are sequentially substituted into first to fifth arguments. The search process in the x direction on LY.top will be described using FIG. 15.

Figure 15:
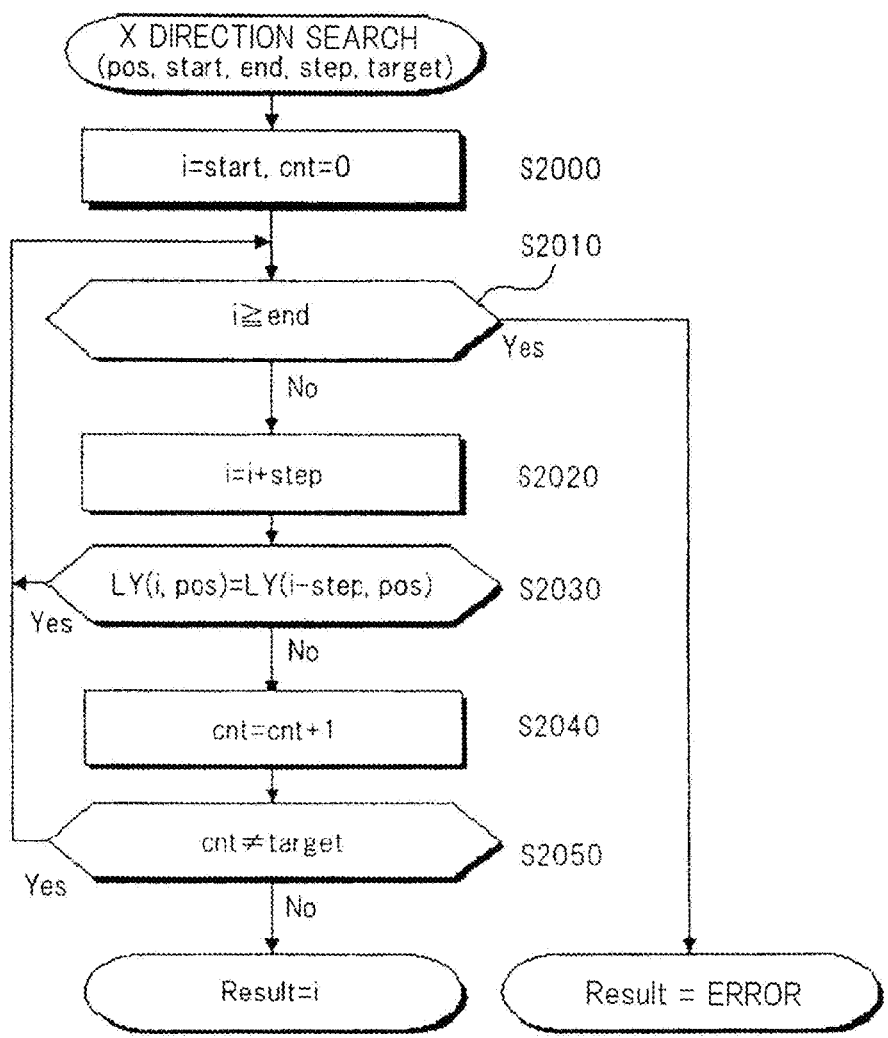
FIG. 15 is a flowchart showing a procedure of a search process in an x direction shown in FIG. 14.

As shown in FIG. 15, in the search process in the x direction on LY.top, the first to fifth arguments are assigned with argument names, "pos", "start", "end", "step" and "target". After the assignment of argument names is completed, a value of "start" representing a starting coordinate of the search is set in counter i for counting the searching range (step S2000).

Next, the value of counter i and the value of "end" representing the ending coordinate of the search are compared with each other (step S2010). In a case where the value of counter i is at least the value of "end", it is determined that the search has failed, "error" is substituted into a return value, Result, and the search process in the x direction is completed.

In a case where the value of counter i is less than the value of "end", the processing proceeds to step S2020 and the search processing in the x direction is continued.

In step S2020, the value of "step" representing a search interval is added to the value of counter i. In order to identify the displacement point on LY.top, LY(i, pos) and LY(i−step, pos) are compared with each other (step S2030). In a case where these values match with each other, the processing returns to step S2010 and the search is continued.

In a case where LY(i, pos) and LY(i−step, pos) do not match with each other, it is determined that the displacement point in the x direction on LY.top has been detected and the processing proceeds to step S2040.

In step S2040, "1" is added to the value of counter "cnt" for counting the displacement point. In order to identify the displacement point, the value of counter "cnt" and the value of "target" representing the number of displacement points are compared with each other (step S2050). In a case where these values do not match with each other, the processing returns to step S2010 and the search process in the x direction is continued. In a case where the values of "cnt" and "target" match with each other, it is determined that a prescribed number of displacement points have been detected, the value of counter i is substituted into the return value, Result, and then the search process in the x direction is completed.

For instance, in a case of inspection image 73 including only one boundary line segment shown in FIGS. 9B and 10B, "target" may be set such that target=1. In a case of inspection image 73 acquired from the display apparatus for N viewpoints (even number) shown in FIG. 10A, it may be set such that target=N/2. In a case of inspection image 73 acquired from the display apparatus for N viewpoints (odd number) shown in FIG. 11B, it may be set such that target=1 and target=2. In a case of inspection image 73 acquired from the display apparatus for N viewpoints (odd number) shown in FIG. 11A, it may be determined such that target=(N−1)/2 and target=(N+1)/2.

In the process of step 1040 shown in FIG. 14, after the search process in the x direction is completed, the return value, Result, is substituted into x.top and thus the x coordinate value x.top of the displacement point on LY.top is determined.

In a case where the x coordinate value x.top of the displacement point on LY.top is not determined, that is, a case where the displacement point on LY.top cannot be detected from inspection image 7, it is determined that the return value, Result, is an error in step 1041 and then the processing is abnormally terminated. In a case where it is determined that the return value, Result, is not an error in step S1041, the processing proceeds to step S1050 and then the value of luminance LY (x, y.max) is searched for x=0 to x.max in order to determine the displacement point of x.bottom on LY.bottom (search in x direction).

In the search process in the x direction on LY.bottom, values "y.max", "x.max", "0", "1" and "1" are sequentially substituted into first to fifth arguments. A process as with step S1040 is performed and thereby the return value, Result, into which a search result has been substituted is substituted into "x.bottom". The x coordinate value of displacement point on LY.bottom, x.bottom, is thus determined.

In a case where the x coordinate value x.bottom of displacement point on LY.bottom is not determined, that is a case where the displacement point on LY.bottom cannot be determined from inspection image 7, it is determined that the return value, Result, is an error in step S1051 and then the processing is abnormally terminated. In a case where it is determined that the return value, Result, is not an error in step S1051, the processing proceeds to step S1060 and then slope θ and position Δx of boundary line segment 74 is calculated using x.top determined in the process of step S1040 and the value of x.bottom determined in the process of step S1050.

Position Δx of boundary line segment 74 can be calculated according to Δx=(x.top+x.bottom)/2−x.center. Slope θ of boundary line segment 74 can be calculated according to $\theta$=arctan(y.max/(x.top−x.bottom)×180/π.

As described above, in a case where position Δx of boundary line segment 74 is +(positive), boundary line segment 74 resides on the right side of inspection image center 71, that is in the +x direction. In a case where position Δx of boundary line segment 74 is − (negative), boundary line segment 74 resides on the left side of inspection image center 71, that is in the −x direction.

In a case where slope θ of boundary line segment 74 is + (positive), boundary line segment 74 is inclined in clockwise direction with respect to y axis direction including inspection image center 71. In a case where slope θ of boundary line segment 74 is − (negative), boundary line segment 74 is inclined in counterclockwise direction. That is, the positional deviation direction and rotational direction of optical means 3 with respect to display panel 2 can be detected from signs (+ or −) of position Δx and slope θ of boundary line segment 74.

The values of position Δx and slope θ of boundary line segment 74 depend on the resolution of a photoelectric conversion element such as a CCD used as photographing means 5, photographing lens magnification, the resolution of the display for displaying inspection image 7 and the angle of view and the like. That is, even if the values of position Δx and slope θ of boundary line segment 74 are used as they are, the relative positional accuracy between display panel 2 of display apparatus 1 and optical means 3 cannot be acquired. Thus, the relative positional accuracy between display panel 2 of display apparatus 1 and optical means 3 is acquired according to the following method using the values of position Δx and slope θ of boundary line segment 74.

Figure 16:
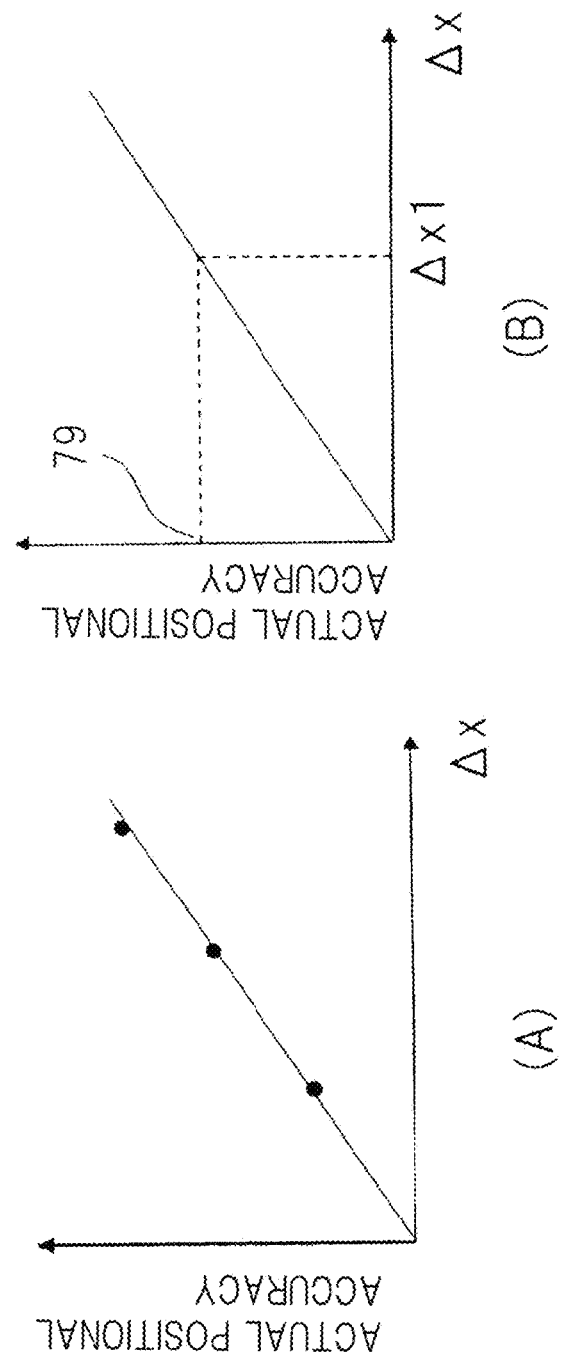
FIGS. 16A and 16B are graphs showing a method for acquiring a relative positional accuracy between a display panel and optical means from position $\Delta x$ and slope $\theta$ of the boundary line segment.

For instance, there is a method that preliminarily prepares display apparatuses 1 with different positional accuracies, acquires each inspection image thereof, detects Δx, and acquires the relationship between the relative positional accuracy between display panel 2 and optical means 3 of each display apparatus 1 and Δx. FIG. 16A shows the relationship between position Δx and the actual positional accuracy acquired as described above.

FIGS. 16A and 16B are graphs showing a method for acquiring a relative positional accuracy between the display panel and the optical means from position Δx and slope θ of the boundary line segment.

As described in FIG. 16A, position Δx and an actual positional accuracy can substantially be represented as a linear function. Accordingly, for instance, the relative positional accuracy between display panel 2 of display apparatus 1 to be inspected and optical means 3 can be acquired by calculating position Δx1 from inspection image 73 of display apparatus 1 to be inspected and then multiplying Δx1 by a prescribed coefficient as shown in FIG. 16B.

There is another method that preliminarily prepares display apparatuses 1 with different positional accuracies, acquires each inspection image thereof, detects Δx, for instance, in the image shown in FIG. 10A acquires a ratio of position Δx to the width of the image in the x direction using image 82 or 83, multiplies the pitch of pixels in the x direction by the ratio among four pixels corresponding to one cylindrical lens and thereby calculates an amount corresponding to an actual positional accuracy. Relative positional accuracy in the x direction between display panel 2 and optical means 3 may be acquired using any one of these methods.

Likewise, as to slope θ of boundary line segment 74, actual slope θ of optical means 3 to display panel 2 can be acquired by multiplying the values of x.top and x.bottom by the prescribed coefficient. Accordingly, the relative positional accuracy between display panel 2 and optical means 3 can be detected on the basis of the values of position Δx and slope θ of boundary line segment 74.

The First Example describes the method that quantitatively calculates position Δx and slope θ of boundary line segment 74 and then acquires the relative positional accuracy between display panel 2 and optical means 3 from the values of position Δx and slope θ. However, the relative positional accuracy between display panel 2 and optical means 3 can be determined by visual inspection. For instance, the arrangement relationship between adjacent first and second image regions 75 and 76 on either side of boundary line segment 74 is compared, thereby easily detecting whether reverse view phenomenon, in which right and left images are replaced with each other depending on the viewpoint, occurs or not.

A figure indicating permissible extents of slope θ and position Δx of boundary line segment 74 is prepared as a limitation sample, which is printed on a transparent sheet with the same scale as that of inspection image 7. The limitation sample of boundary line segment 74 is overlaid on inspection image 73 to be inspected, and they are compared with each other. Thus, pass or fail of the relative positional accuracy between display panel 2 and optical means 3 can easily be determined by visual inspection.

Second Example

Figure 17:
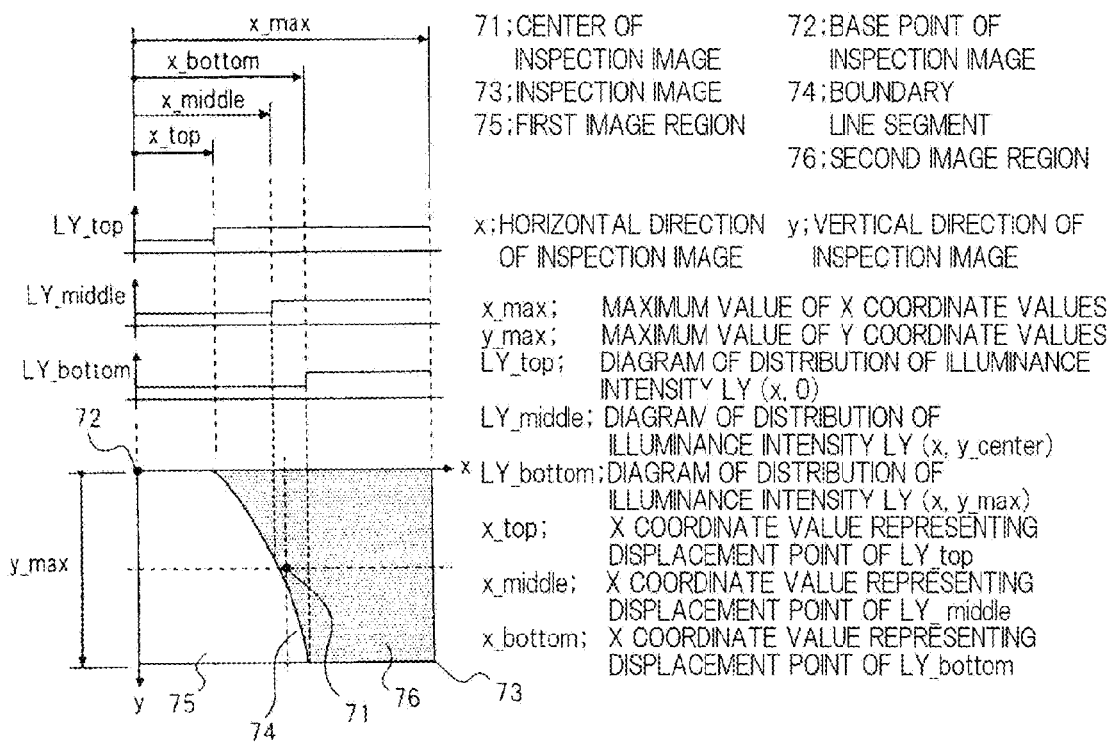
FIG. 17 is a schematic diagram showing an example of an inspection image to be processed by an inspection method of a Second Example.

FIG. 17 is a schematic diagram showing an example of an inspection image to be processed by an inspection method of a Second Example.

In a mounting accuracy inspection method of the Second Example, a procedure for extracting slope θ and position Δx of boundary line segment 74 using LY.middle and x.middle is added to the procedure for extracting slope θ and position Δx of boundary line segment 74 shown in the First Example.

LY.middle represents a distribution of luminance in the x direction at y.center disposed at midpoint in a y direction between base point 72 and y.max. In the Second Example, in addition to the process of determining x.top and x.bottom shown in the First Example, the first to fifth arguments are assigned with argument names of y.center, 0, x.max, 1 and 1, and subsequently a process shown in FIG. 15 is performed. This also determines the x.middle, which is the coordinate of the displacement point on LY.middle.

Further, in the Second Example, a deviation between Δx, calculated using x.top and x.bottom, and x.middle, and linearity of boundary line segment 74 is detected.

Detection of the linearity of boundary line segment 74 as described above allows the distortion of optical means 3 to be detected. For instance, in a case of adopting lenticular lens 3 (see FIG. 8), where cylindrical lenses 31 are arranged in the x direction, as optical means 3, it can be determined whether the principal axis of the lens is parallel to the y direction or not.

When lenticular lens 3 is fixedly cemented to display panel 2, if lenticular lens 3 is cemented with nonuniform pressure distribution, lenticular lens 3 may be deformed. Lenticular lens 3 may originally include an optical distortion. Owing to these causes, the principal axis of the lens does not become parallel to the y direction, and a nonlinear slope may appear in boundary line segment 74. In these cases, the inspection method of this Example is effective.

The above description illustrates the case in which the process of search in the x direction at the center y.center of y.max is added and then the coordinate, x.middle, of the displacement point at the y.center is determined. Further, processes of search in the x direction are performed on respective positions on the y axis, the coordinates x.middle of the displacement points for the positions on the y axis are determined, and deviations between these values and Δx are acquired, thereby allowing the linearity of boundary line segment 74 to be acquired more accurately.

(Third Example)

As with the First Example, the mounting accuracy inspection method of the Third Example includes: a first step of displaying a first pattern on display apparatus 1 corresponding to a first viewpoint group, displaying a second pattern corresponding to a second viewpoint group and then acquiring position Δx and slope θ of boundary line segment 74; and a second step of displaying the second pattern corresponding to the first viewpoint group, displaying the first pattern corresponding to the second viewpoint group and then acquiring position Δx and slope θ of boundary line segment 74. Position Δx and slope θ of boundary line segment 74 are acquired by calculating the average value of values acquired in respective steps. The second step does not necessarily replace the first and second patterns with each other. Instead, completely different patterns may be set as the first and second patterns for the second step.

Figure 18:
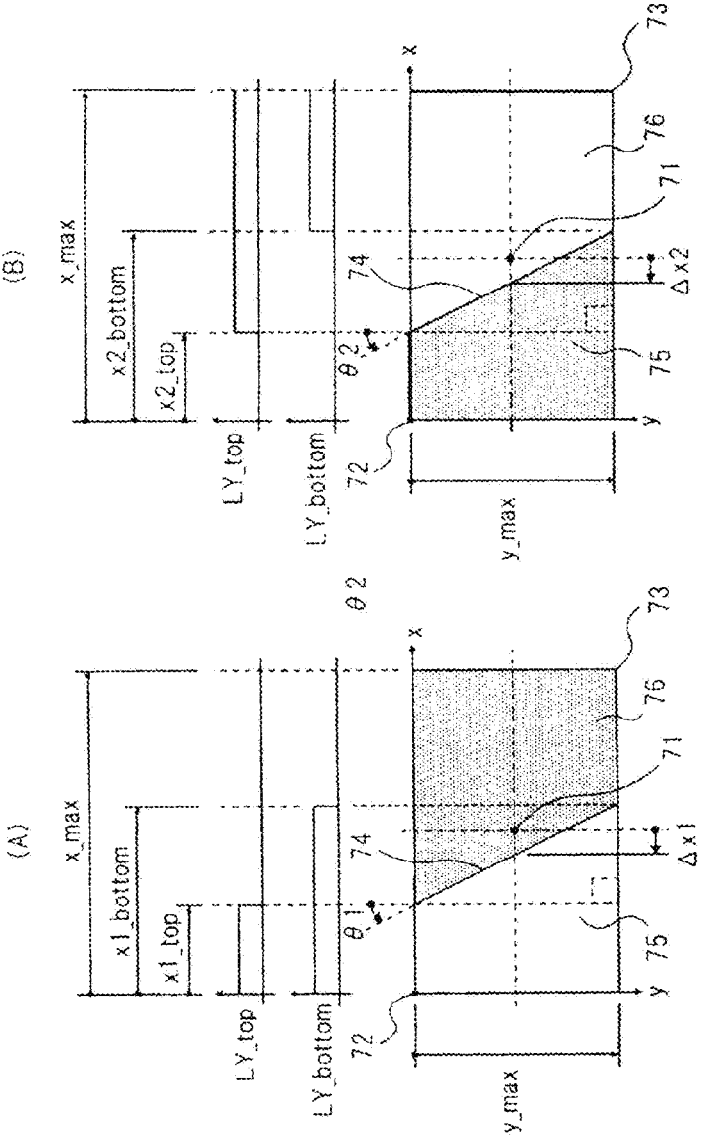
FIGS. 18A and 18B are schematic diagrams showing an example of an inspection image to be processed by an inspection method of a Third Example.

FIGS. 18A and 18B are schematic diagrams showing an example of an inspection image to be processed by the inspection method of the Third Example.

FIG. 18A shows an example of first inspection image 73 acquired in a case where, as to test pattern 7, perfect white is displayed as the first pattern for the first viewpoint and perfect black is displayed as the second pattern for the second viewpoint. FIG. 18B shows an example of second inspection image 73 in a case where the patterns of test pattern 7 shown in FIG. 18A for respective viewpoints are replaced with each other.

As with the First Example, in the Third Example, position Δx1 and slope Δθ1 of boundary line segment 74 are calculated from the first inspection image, position Δx2 and slope Δθ2 of boundary line segment 74 are calculated from the second inspection image. The relative positional accuracy between display panel 2 and optical means 3 is then detected using average value thereof. Δx=(Δx1+Δx2)/2, θ=(θ1+θ2)/2.

According to the inspection method of the Third Example, the patterns to be displayed replace each other and thus two inspection images are acquired, and the averages of positions Δx and slopes Δθ of boundary line segment 74 are acquired. This can reduce detection error of position Δx and slope Δθ of boundary line segment 74, which is due to optical characteristics of display apparatus 1, such as contrast, and electro-optic characteristics of the photographing means, such as luminous sensitivity.

The above description is illustrated using the case of using two patterns with different gradation values as test pattern 7. Further, this example can be applied to a case using two patterns with different colors as test pattern 7. A variation using two patterns with different colors as test pattern 7 will hereinafter be described.

Figure 19:
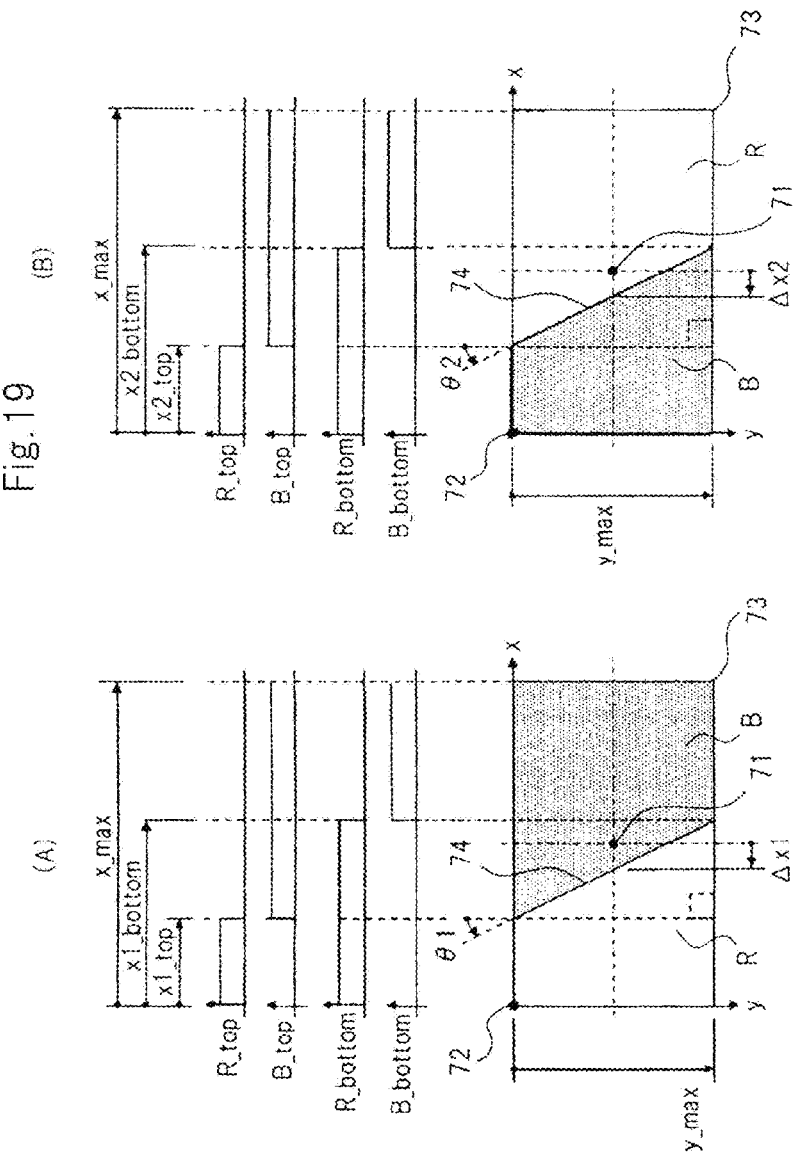
FIG. 19 is a schematic diagram showing an example of an inspection image to be inspected by a variation of the Third Example.

FIG. 19 is a schematic diagram showing an example of an inspection image to be inspected by a variation of the Third Example.

FIG. 19A shows an example of first inspection image 73 acquired in a case where, as to test pattern 7, blue (B) is displayed as the first pattern for the first viewpoint and red (R) is displayed as the second pattern for the second viewpoint. FIG. 19B shows an example of second inspection image 73 acquired in a case of replacing the patterns of test pattern 7 shown in FIG. 19A for respective viewpoints with each other.

As described above, the image memory, which is not shown, included in the display apparatus is stored with values of luminance RGB (x, y) for colors of RGB corresponding to coordinate positions as image data of inspection image 73. The variation of the Third Example searches a luminance distribution of red (R) and a luminance distribution of blue (B) using the values of RGB(x, y) and detects the displacement point.

First, the first inspection image is used, and R1.top which represents the displacement point is determined by a search process in the x direction from R.top representing the luminance distribution of red (R) on y.top; B1.top which represents the displacement point is determined by a search process in the x direction from B.top representing the luminance distribution of blue (B) on y.top.

Further, the first inspection image is used, and R1.bottom which represents the displacement point is determined by a search process in the x direction from R.Bottom representing the luminance distribution of red (R) on y.bottom; B1.bottom which represents the displacement point is determined by a search process in the x direction from B.Bottom representing the luminance distribution of blue (B) on y.bottom.

Position Δx1 and slope Δθ1 of boundary line segment 74 are calculated using any one of acquired R1.top and B1.top, or the average value thereof, x1.top and any one of R1.bottom and B1.bottom, or the average value thereof, x1.bottom.

Likewise, position Δx2 and slope Δθ2 of boundary line segment 74 are calculated using the second inspection image. The average values thereof, Δx=(Δx1+Δx2)/2 and θ=(θ1+θ2)/2, are calculated. The relative positional accuracy of display panel 2 and the optical means is calculated using values of Δx and θ.

As with this variation, use of two patterns with different colors as test pattern 7 exerts an effect of stably acquiring position Δx and slope Δθ of boundary line segment 74. For instance, illumination light from the outside or the shade of a shield may be reflected onto the surface of display apparatus 1. Accordingly, if two patterns with different gradation values are used as test pattern 7, the illumination light or the shade of the shield may be reflected into inspection image 73, which may cause false detection of position Δx or slope Δθ of boundary line segment 74. Adverse effects owing to illumination light, the shade of a shield and the like exerted on detection of the displacement point of chromaticity information based on RGB values are less than on detection of the displacement point of illuminance information based on gradation values. The former can stably detect boundary line segment 74. Accordingly, position Δx and slope Δθ of boundary line segment 74 can stably be acquired from inspection image 73.

This exemplary embodiment illustrates the case where display apparatus 1 and photographing means 5 are arranged in such a distance that the observer can stereoscopically view them. Such a configuration infrequently causes a case of obscure boundary line segment 74 according to a certain distance between display apparatus 1 and photographing means 5 or certain specifications of display apparatus 1 and photographing means 5. In this case, the displacement point of luminance cannot sometimes be detected and thus position Δx or slope Δθ cannot be detected. Even if position Δx and slope Δθ of boundary line segment 74 can be extracted, the relationship between the extracted value and actual relative positional accuracy of the display panel and optical means sometimes greatly differ from each other.

The method of using different colors for test pattern 7 shown in this variation can detect the displacement point of RGB (x, y) in high accuracy even with obscure boundary line segment 74. Further, the patterns for respective viewpoints in test pattern 7 are replaced with each other and two inspection images are acquired, and the averages of values of position Δx and slope Δθ of boundary line segment 74 acquired from the two inspection image are taken. This improves the detection accuracy of position Δx and slope θ of boundary line segment 74.

Further, since red (R) and blue (B) with opposite hues are used for test pattern 7, the boundary in the regions in the inspection image is emphasized and clarified. This allows boundary line segment 74 to be easily detected. Accordingly, even in a case of visual inspection, inspection time can be shortened. Further, since the patterns of test pattern 7 for respective viewpoints are replaced with each other and the two inspection images are presented, psychological effects on the observer based on specific color information can be canceled. For instance, the aforementioned obscure boundary line segment 74 is recognized as magenta (M) in which blue (B) and red (R) are mixed. In this case, since magenta (M) is absorbed into red (R) with a close hue, the observer feels that the region of red (R) is wider. In a case where a region around test pattern 73 is black, the observer feels that the region of blue (B) with a hue close to black is wider than an actual lighting area. It is considered that such effects on the observer owing to the colors can be cancelled by presenting two inspection images.

(Second Exemplary Embodiment)

Contrary to the first exemplary embodiment, a second exemplary embodiment describes an inspection method using an inspection image acquired within a photographing distance in which stereoscopic visual inspection cannot be performed.

Figure 20:
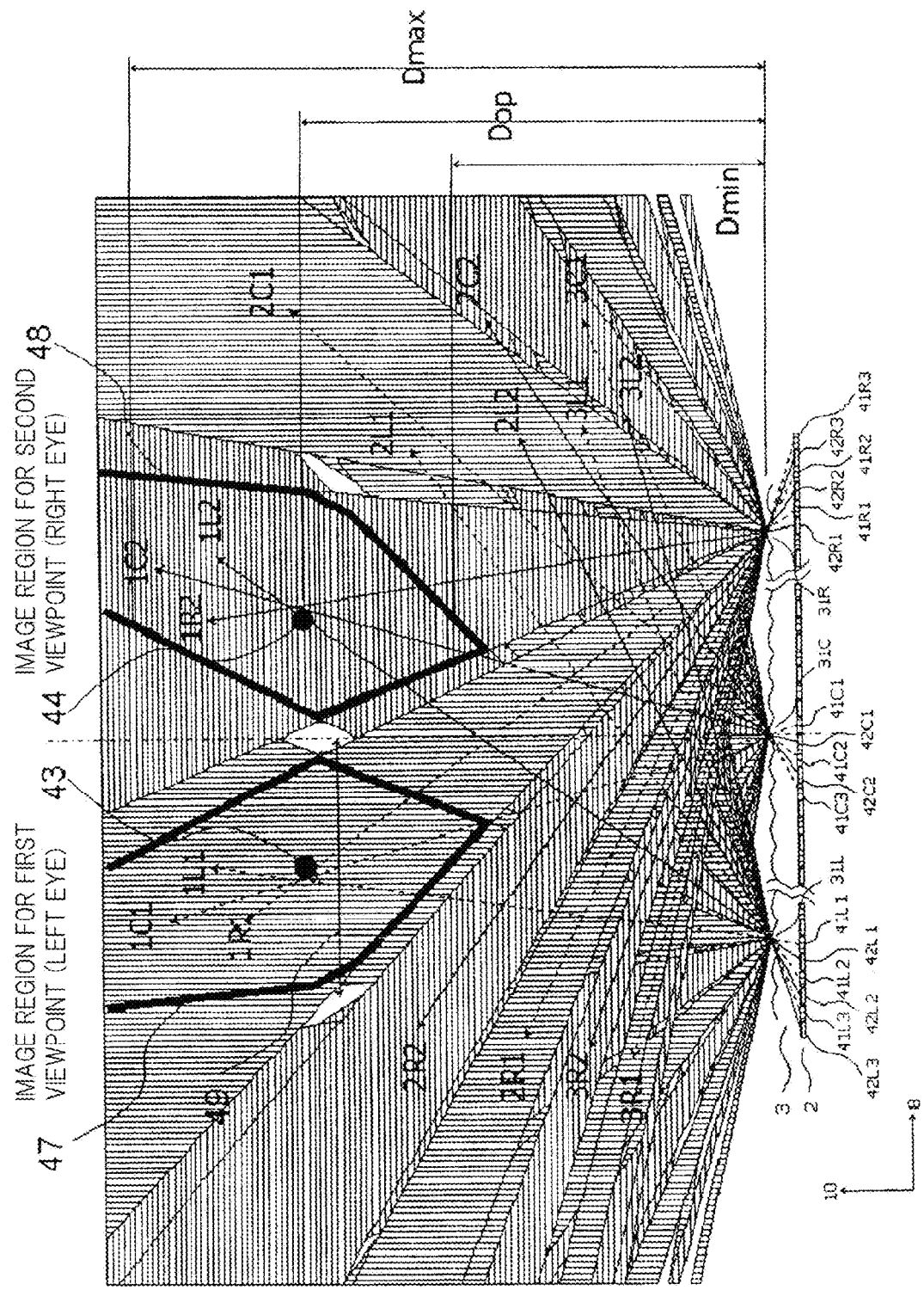
FIG. 20 is a schematic diagram showing an example of a stereoscopic visual field formed when a lenticular lens is used as optical means of a display apparatus.

FIG. 20 is a schematic diagram showing an example of a stereoscopic visual field formed in a case of using a lenticular lens as optical means 3 of display apparatus 1.

In display panel 2 there are sequentially arranged pixels 41L1 to 41L3 (left side of display apparatus 1) along x axis direction 8, pixels 41C1 to 41C3 (center of display apparatus 1) and pixels 41R1 to 41R3 (right side of display apparatus 1) for the first viewpoint, and pixels 42L1 to 42L3 (left side of display apparatus 1), pixels 42C1 to 42C2 (center of display apparatus 1) and pixels 42R1 to 42R3 (right side of display apparatus 1) for the second viewpoint.

Lenticular lens 3 has a configuration in which cylindrical lenses 31 are arranged along x axis direction 8 at a prescribed pitch. Pixels 41L1 to 41L3 for the first viewpoint and pixels 42L1 to 42L3 for the second viewpoint correspond to cylindrical lens 31L (left side of display apparatus 1). Pixels 41C1 to 41C3 for the first viewpoint and pixels 42C1 to 42C2 for the second viewpoint correspond to cylindrical lens 31C (center of display apparatus 1). Pixels 41R1 to 41R3 for the first viewpoint and pixels 42R1 to 42R3 for the second viewpoint correspond to cylindrical lens 31R (right side of display apparatus 1).

Reference symbols 1L1, 2L1 and 3L1 shown in FIG. 20 denote optical paths of light emitted from pixels 41L1, 41L2 and 41L3 for the first viewpoint and refracted by cylindrical lens 31L. Reference symbols 1L2, 2L2 and 3L2 denote optical paths of light emitted from pixels 42L1, 42L2 and 42L3 for the second viewpoint and refracted by cylindrical lens 31L.

Reference symbols 1C1, 2C1 and 3C1 shown in FIG. 20 denote optical paths of light emitted from pixels 41C1, 41C2 and 41C3 for the first viewpoint and refracted by cylindrical lens 31C. Reference symbols 1C2 and 2C2 denote optical paths of light emitted from pixels 42C1 and 42C2 for the second viewpoint and refracted by cylindrical lens 31C.

Likewise, reference numerals 1R1, 2R1 and 3R1 shown in FIG. 20 denote optical paths of light emitted from pixels 41R1, 41R2 and 41R3 for the first viewpoint and refracted by cylindrical lens 31R. Reference numerals 1R2, 2R2 and 3R2 denote optical paths of light emitted from pixels 42R1, 42R2 and 42R3 for the second viewpoint and refracted by cylindrical lens 31R.

Here, actual light passing through the optical path has a prescribed angle width in the clockwise or counterclockwise direction with respect to the optical path. Image region 47 for the first viewpoint is formed in a region including the point at which optical paths 1L1, 1C1 and 1R1 intersect with each other. Image region 48 for second viewpoint is formed in a region including the point at which optical paths 1L2, 1C2 and 1R2 intersect with each other. Image region 47 for the first viewpoint (left eye) and image region 48 for the second viewpoint (right eye) correspond to a stereoscopic viewing range allowing a stereoscopic view.

Optimal stereoscopic viewing distance at which the stereoscopic viewing range is the maximum is defined as reference symbol Dop. The maximum stereoscopic viewing distance is defined as reference symbol Dmax, and the minimum stereoscopic viewing distance is defined as reference symbol Dmin, on the basis of y axis direction 10 of the right and left eyes and an intersection between image region 47 for the first viewpoint and image region 48 for the second viewpoint. Reference numeral 49 denotes a pitch between the viewpoints, and is hereinafter referred to as a viewpoint pitch.

Here, attention is paid to cylindrical lens 31L. Light contributing to the formation of image forming region 47 for the first viewpoint and image forming region 48 for second viewpoint is only light 1L1 and 1L2 emitted from pixels 41L1 and 42L1, respectively. This light is defined as primary light. Light 2L1 and 2L2 emitted from pixels 41L2 and 42L2 adjacent to pixels 41L1 and 42L1 and refracted by cylindrical lens 31L is defined as secondary light. Likewise, light 3L1 and 3L2 emitted from pixels 41L3 and 42L3 secondarily adjacent to pixels 41L1 and 42L1 and refracted by cylindrical lens 31L is defined as tertiary light.

Likewise, as to light related to cylindrical lenses 31C and 31R, primary light contributes to formation of image forming regions 47 and 48 for the first and second viewpoints.

As shown in FIG. 20, if the viewing distance is shorter than minimum stereoscopic viewing distance Dmin, it can be understood that effects due to higher-order light, such as secondary light and tertiary light emitted from right and left sides of display apparatus 1 become obvious.

Figure 21:
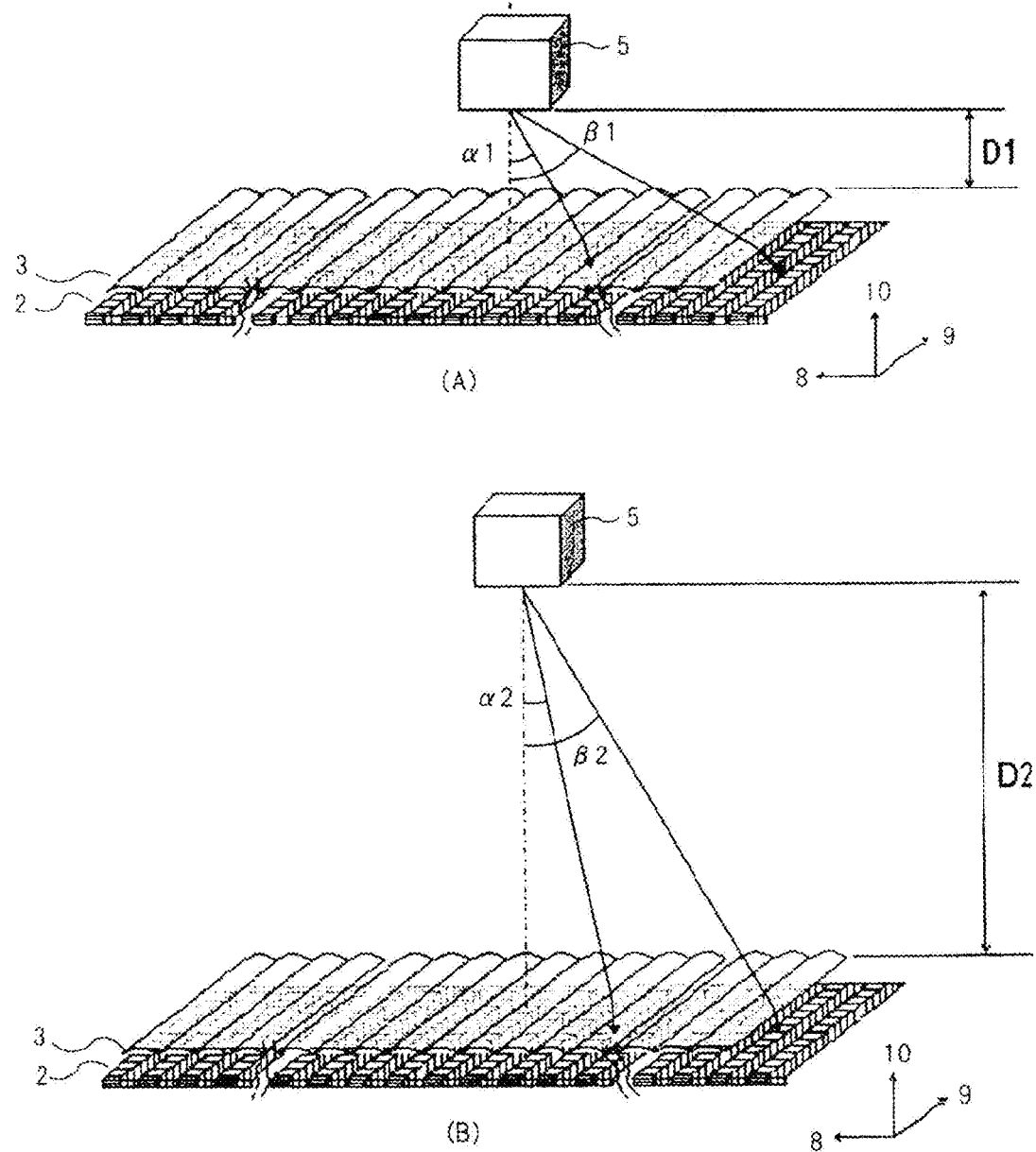
FIGS. 21A and 21B are schematic diagrams showing an example of arrangement of a display apparatus and photographing means of a second exemplary embodiment.

FIGS. 21A and 21B are schematic diagrams showing an example of arrangement of display apparatus 1 and photographing means 5 used for the inspection method of the second exemplary embodiment. FIG. 21A shows a manner in which the inspection image is taken at distance D1 sufficiently short with respect to minimum stereoscopic viewing distance Dmin FIG. 21B shows the manner in which the inspection image is taken at distance D2 within a range from minimum stereoscopic viewing distance Dmin to maximum stereoscopic viewing distance Dmax. The aforementioned first exemplary embodiment corresponds to FIG. 21B.

Figure 22:
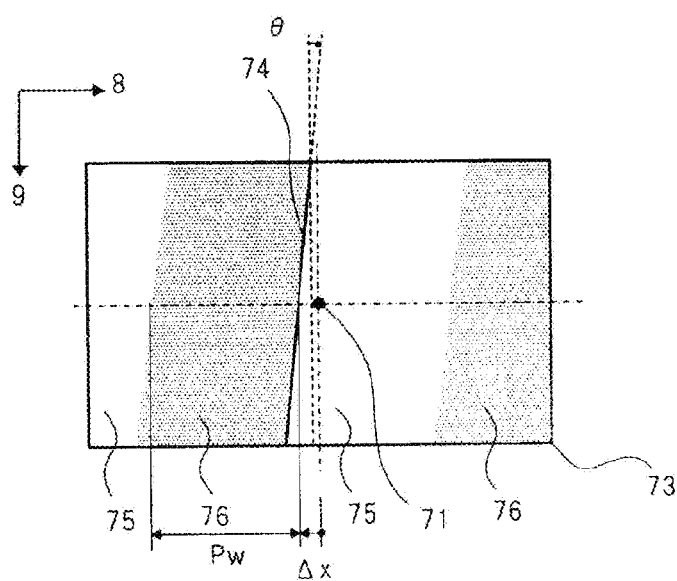
FIG. 22 is a schematic diagram showing an example of an inspection image acquired by an inspection method of the second exemplary embodiment.

FIG. 22 is a schematic diagram showing an example of an inspection image acquired by the photographing means shown in FIG. 21A. Here, positional accuracy between display panel 2 of display apparatus 1 and optical means 3 is identical to that of the first exemplary embodiment. Accordingly, the inspection image acquired under conditions shown in FIG. 21B is identical to that shown in FIG. 9B.

In comparison between FIGS. 22 and 9B, it can be understood that the first and second image regions are replaced with each other with respect to the x axis direction. The rotational direction of slope θ of boundary line segment is reversed with respect to the y axis direction. Further, width Pw in the x axis direction of first and second image regions 76 and 75 for forming boundary line segment 74 is narrowed, and second and first image regions 75 and 76 appear outside of these images. This is because width Pw is a dimension dependent on the viewpoint pitch and the viewpoint pitch is small owing to photographing distance D1 being short.

Such variation of the inspection image dependent on the photographing distance will be described using FIGS. 21A and 21B.

First, in FIG. 21B, photographing distance D2 is within the range from minimum stereoscopic viewing distance Dmin to maximum stereoscopic viewing distance Dmax. Accordingly, if a line segment having angles α2 and β2 to the principal axis of each cylindrical lens of lenticular lens 3 as the optical means is drawn from the center of photographing means 5, a corresponding pixel can be identified on the basis of a refraction angle in which the refractive index of the lenticular lens is applied to Snell's laws with respect to the line segment and a distance in the z direction between the lens and each pixel for the viewpoint arranged on display panel 2. A prescribed inspection image corresponding to the test pattern input into the corresponding pixels is input into photographing means 5. Likewise, the inspection image to be displayed on the entire display screen can be acquired by applying a line segment having angles other than α2 and β2 to the entire x-y plane of display panel 2 and by identifying the corresponding pixel. In photographing distance D2 shown in FIG. 21B, primary light shown in FIG. 20 is basically dominant. Accordingly, as with the visually inspected image, the inspection image shown in FIG. 9B is acquired.

On the other hand, at photographing distance D1 shown in FIG. 21A, a line segment having angles α1 and β1 to the principal axis of each cylindrical lens is drawn from the center of photographing means 5 and thereby the pixel corresponding to this line segment can be identified. A prescribed inspection image corresponding to the test pattern input into the corresponding pixel is input into photographing means 5.

Figure 23:
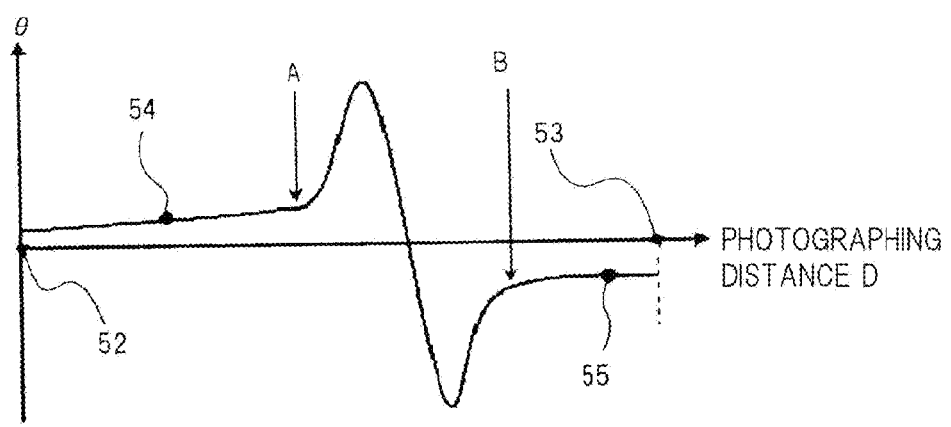
FIG. 23 is a graph showing variation of slope $\theta$ of a boundary line segment of an inspection image with respect to a photographing distance.

In a case where the photographing distance is D1, higher-order light, such as secondary light and tertiary light, from any pixel contribute to formation of the inspection image. Accordingly, the inspection image is not the same as the inspection image shown in FIG. 9B. For instance, in a case where photographing distance D1 is equal to or less than one half of minimum stereoscopic viewing distance Dmin, the inspection image shown in FIG. 22 is acquired. FIG. 23 shows variation of slope θ of boundary line segment 74 in inspection image 73 with respect to photographing distance D.

FIG. 23 is a graph showing variation of slope θ of the boundary line segment of the inspection image with respect to the photographing distance. In FIG. 23, the axis of abscissas represents photographing distance D, and the axis of ordinates represents slope θ of boundary line segment 74 in inspection image 73 acquired by taking an image displayed on display apparatus 1.

As shown in FIG. 23, it can be understood that slope θ largely varies in a region where photographing distance D is between A and B. This region is a transitional region from the higher-order light to the primary light, and it is difficult to acquire a stable inspection image in this region. There are roughly two photographing distances D with which the amount of variation of slope θ with respect to photographing distance D, or a differential coefficient, is the minimum. The first one is first distance 54 at which the inspection image is formed mainly by the higher-order light. The second one is second distance 55 at which the inspection image is formed by primary light. The first exemplary embodiment shows the examples adopting the inspection image acquired at second distance 55. The second exemplary embodiment shows examples adopting the inspection image acquired at first distance 54.

First distance 54 is preferably set such that the differential coefficient of slope θ with respect to photographing distance D is the minimum. In a case where photographing distance D shown in FIG. 23 is shorter than A, any photographing distance at which variation of the differential coefficient of slope θ with respect to the photographing distance converges within ±5% may be set.

With the setting of such a photographing distance, the variation of the differential coefficient of slope θ converges within ±5%. Accordingly, an advantage is acquired in that the effect of disturbance exerted on boundary line segment 74 is small and slope θ of boundary line segment 74 can stably be acquired. This is also applicable to the first exemplary embodiment.

Further, since the photographing distance is short, the image quality of the inspection image is improved in comparison with the first exemplary embodiment. This also contributes to improvements in accuracy of detecting slope θ and position Δx of boundary line segment 74.

As described in the first exemplary embodiment, the values of position Δx or slope θ of boundary line segment 74 depend on the resolution of a photoelectric conversion element such as CCD used for photographing means 5, photographing lens magnification, and the resolution and the angle of view of the display on which inspection image 7 is displayed. Accordingly, the first exemplary embodiment describes the specific method for acquiring the relative positional accuracy between display panel 2 of display apparatus 1 and optical means 3 using the values of position Δx or slope θ of boundary line segment 74.

In the second exemplary embodiment, the attention is paid to the fact that the enlarging magnification of optical means 3 varies according to photographing distance D. The reciprocal of the magnification is applied to the method described in the first exemplary embodiment. Accordingly, the relative positional accuracy between display panel 2 and optical means 3 may be acquired according to photographing distance D.

An Example of the inspection method of the second exemplary embodiment will hereinafter be described using the drawings.

Fourth Example

A Fourth Example describes a method for calculating slope θ and position Δx of boundary line segment 74 in a case where photographing distance D of photographing means 5 to display apparatus 1 is set to second distance 54 which is less than minimum stereoscopic viewing distance Dmin, and at least three boundary line segments 74 are included in inspection image 73.

Figure 24:
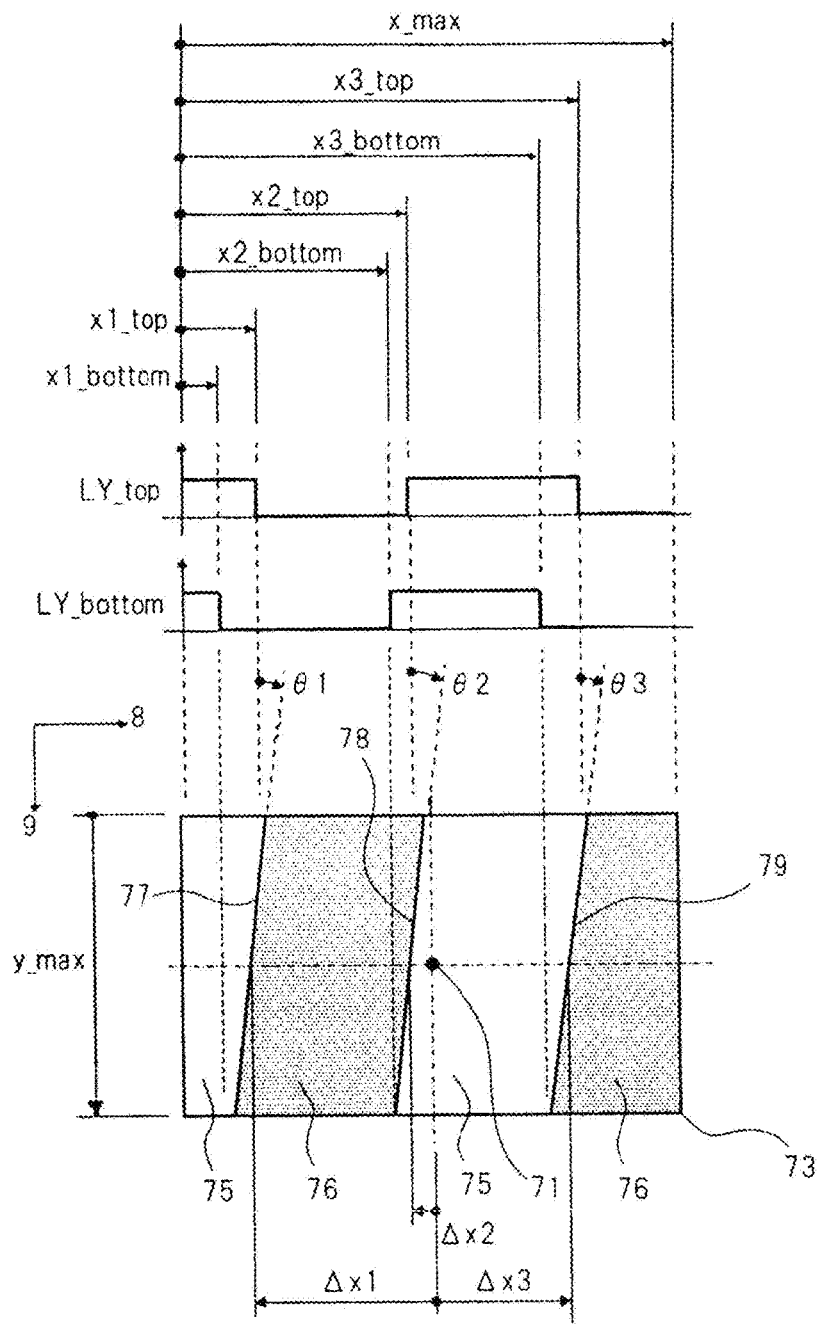
FIG. 24 is a schematic diagram showing an example of an inspection image acquired by an inspection method of a Fourth Example.

FIG. 24 is a schematic diagram showing an example of an inspection image acquired by the inspection method of the Fourth Example.

FIG. 24 shows first boundary line segment 77, second boundary line segment 78 and third boundary line segment 79, and slopes θ1, θ2 and θ3 and positions Δx1, Δx2 and Δx3 of the boundary line segments acquired by the procedure (FIGS. 14 and 8) that are substantially identical to the First Example, on inspection image 73 shown in FIG. 22.

Slope θ and position Δx of boundary line segment 74 shown in FIG. 13 correspond to slope θ2 and position Δx2 of boundary line segment 78 shown in FIG. 24, respectively. Accordingly, the relative positional accuracy in the x direction between display panel 2 and optical means 3 can be detected using the values of slope θ2 and position Δx2. In this case, target=2 in the search process in the x direction shown in FIG. 15.

In this Example, since the width of the viewpoint pitch can be confirmed, the angle of view of display apparatus 1 can be acquired. For instance, the value of |x2.top|x1.top|, |x3.top−x2.top|, |x2.bottom−x1.bottom| or |x3.bottom−x2.bottom| depends on the viewpoint pitch. In a case where the variation of the value is large according to display apparatus 1 and a case where the sizes of |x2.top−x1.top| and |x2.bottom−x1.bottom| are different from each other, the pitch accuracy of the cylindrical lens or the parallax barrier, which is optical means, and the error of positional accuracy of the optical principal axis can be detected.

This can be substituted by monitoring the differences between slopes θ1, θ2 and θ3. The values of |θ2−θ1| and |θ2−θ3| can be managed as inspection values.

Further, the concept described in the Second Example that determines the linearity of boundary line segment 74 by acquiring LY.middle can be applied to the Fourth Example. As shown in the Second Example, the distortion of the optical means can be detected by acquiring the linearity of boundary line segment 74.

In a case where the optical means has distortion, the values of slopes θ1, θ2 and θ3 sometimes differ largely from each other. Thus, the values of |θ2−θ1| and |θ2−θ3| are managed as the inspection values, thereby allowing such distortion of the optical means to be detected.

FIG. 24 shows the example in which the first and second image regions are different in luminance from each other. However, the Fourth Example can be applied to the test pattern with different colors as described in the variation of the Third Example. Further, the Fourth Example can be applied to the method that, as shown in FIGS. 18A and 18B, replaces the first and second patterns with each other and uses the averages of slopes θ and positions Δx of boundary line segment 74. The advantageous effects in the cases of applying these methods are substantially identical to those of the first exemplary embodiment.

The description of the Fourth Example uses the example in which the number of viewpoints is two. However, the Fourth Example can be applied to a case of displaying an image for N viewpoints whose number of viewpoints is at least three. The details described in the first exemplary embodiment that the processing methods are different according to whether N is an odd number or an even number can be applied as they are.

As described above, in the second exemplary embodiment, the relative positional accuracy between display panel 2 and optical means 3 is acquired using the inspection image acquired at a photographing distance that is too short for stereoscopic view. Accordingly, in the second exemplary embodiment, in contrast to the first exemplary embodiment, the inspection image cannot be visually inspected. However, the second exemplary embodiment exerts the following advantages in addition to advantageous effects that are substantially identical to those of the first exemplary embodiment.

In second exemplary embodiment, since the photographing distance is short, the image quality of the inspection image is improved. It is important to acquire a sharp inspection image to securely extract boundary line segment 74 from the inspection image. If the photographing distance is long, a high-performance lens optical system is required to acquire a sharp image. This causes a problem that increases the cost of the inspection apparatus. In this exemplary embodiment, the relative positional accuracy between display panel 2 and optical means 3 can be acquired at low cost.

In the second exemplary embodiment, the amount of information acquired from the inspection image is increased. In the second exemplary embodiment, the width corresponding to the viewpoint pitch is shortened. This increases the number of boundary line segments. Thus, information of slopes θ, positions Δx and viewpoint pitches of the boundary line segments is acquired. Accordingly, in addition to the relative positional accuracy between display panel 2 and optical means 3, pitch accuracy and the distortion occurring at the position of the optical principal axis of optical means 3 can be detected.

Further, in the second exemplary embodiment, the photographing distance is shortened. Accordingly, the inspection apparatus can be downsized. An example of configuration of the inspection apparatus will be described in a following third exemplary embodiment. An inspection apparatus adopting the inspection method of the second exemplary embodiment can be downsized, which also contributes to reduction in cost.

(Third Exemplary Embodiment)

As to the third exemplary embodiment, inspection apparatuses using the methods described in the first to Fourth Examples will be described.

Figure 25:
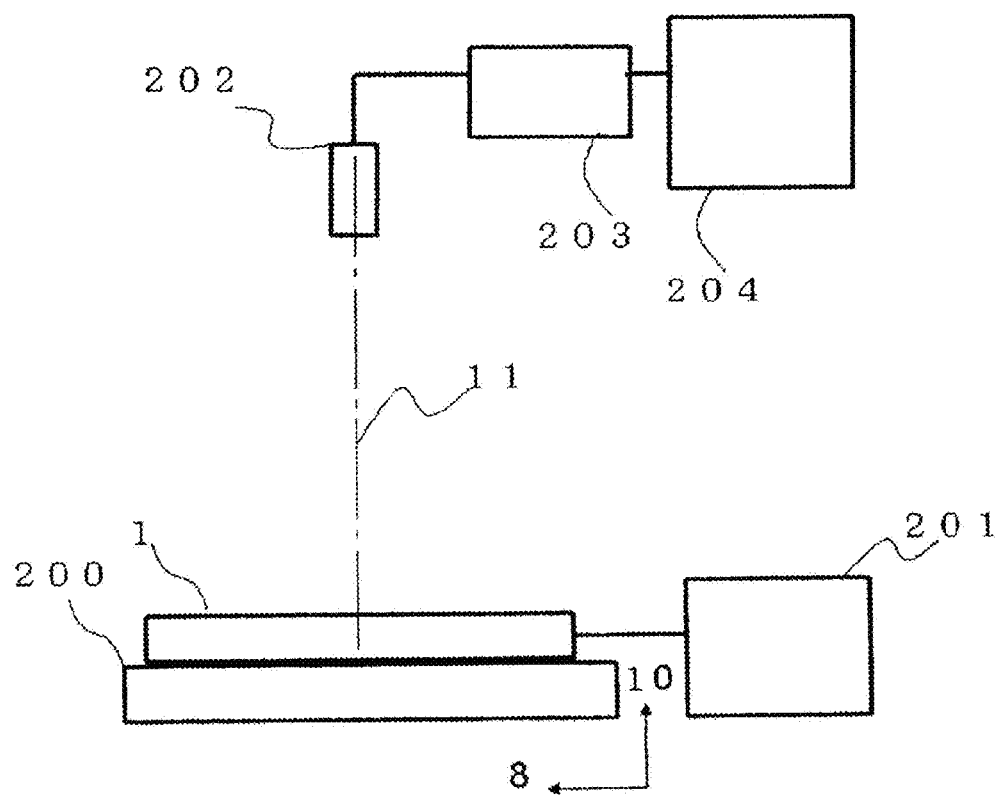
FIG. 25 is a block diagram showing an example of a configuration of an inspection apparatus of the present invention.

FIG. 25 is a block diagram showing an example of the configuration of an inspection apparatus of the present invention.

As shown in FIG. 25, inspection apparatus 210 has a configuration including: inspection stage 200 on which display apparatus 1 to be inspected is mounted; image output circuit 201 that outputs an image signal for causing display apparatus 1 to display test pattern 7; inspection camera 202 that is installed in z direction 10 to inspection stage 200 and photographs the display screen of display apparatus 1; detection circuit 203 that detects the slope and position of the boundary line segment from inspection image 73 taken by inspection camera 202; and monitor 204 for displaying an inspection result by detection circuit 203. The photographing distance of inspection camera 202 to display apparatus 1 is set to the distance described in each example.

Inspection stage 200 includes positioning pins for positioning display apparatus 1 by pressing the corner of display apparatus 1 thereagainst. Display apparatus 1 is mounted using the positioning pins such that display center 11 and the photographing center of inspection camera 202 in x direction 8 match with each other. The positioning pins are provided on at least two sides of display apparatus 1 so as not to deviate display apparatus 1 in direction 6.

Image output circuit 201 includes: a signal generation circuit generating, for instance, test pattern 7 shown in FIG. 9A on display apparatus 1; and a power supply device supplying the signal generation circuit with electric power required for operation. Image output circuit 201 generates an image signal for causing display apparatus 1 to display first pattern 7A on pixels 41 for the first viewpoint and to display second pattern 7B on pixels 42 for the second viewpoint. Test pattern 7 may be displayed in a manner where the positions of first and second patterns 7A and 7B are replaced with each other.

Inspection camera 202 includes: a lens optical system for taking inspection image 73; a CCD as a photographing element; and an image memory for holding the image signal photographed by the CCD. The image signal held in the image memory is output as inspection image 73 to detection circuit 203.

Detection circuit 203 extracts slope θ and position Δx of boundary line segment 74 from inspection image 73 taken by inspection camera 202. Detection circuit 203 can be realized by a processing device including a CPU and a storing device required for processing in the CPU, and performs the processes shown in FIGS. 14 and 15 pursuant to a prescribed program and displays the values of slope θ and position Δx of boundary line segment 74 extracted from inspection image 73 on monitor 204. The relative positional accuracy between display panel 2 and optical means 3 included in display apparatus 1 can be acquired by comparing the values of slope θ and position Δx of boundary line segment 74 displayed on monitor 204 with preset values. Detection circuit 203 may preliminarily store preset values of permissible accuracies of slope θ and position Δx, compare the permissible accuracy with the values of slope θ and position Δx extracted from inspection image 73 and then output a comparison result to monitor 204.

As shown in Fourth Example, in the case of setting the short photographing distance, absolute values or determination values representing the inspection result, such as values θ1, θ2 and θ3 and Δx1, Δx2 and Δx3, values |θ2-θ1| and |θ2-θ3| representing the amount of nonuniform distortion of optical means 3, and values |x2.top-x1.top|, |x2.top-x1.top| and |x3.top-x2.top| corresponding to the viewpoint pitch, may be displayed on monitor 204 according to required inspection items.

Further, without use of detection circuit 203, inspection camera 202 and monitor 204 may be connected to each other, and inspection image 73 may directly be displayed on monitor 204. In this case, the relative positional accuracy between display panel 2 and optical means 3 included in display apparatus 1 may be determined from boundary line segment 74 displayed on monitor 204, by means of visual inspection.

The photographing distance of inspection camera 202 to display apparatus 1 is set to the distance described in each of the aforementioned examples. Setting of the photographing distance described in the Fourth Example enables inspection apparatus 210 to be downsized and reduced in space, and allows the acquisition of a high quality inspection image without using of expensive inspection camera 202. This in turn allows the inspection apparatus to be reduced in cost.

Inspection apparatus 201 described in the third exemplary embodiment can be applied not only to the process of inspecting the positional accuracy between display panel 2 and optical means 3 included in display apparatus 1 but also to a process of mounting optical means 3 on display panel 2. For instance, in a case of fixing optical means 3 on display panel 2 using glue or adhesive, slope θ and position Δx of boundary line segment 74 are acquired from inspection image 73 using inspection apparatus 210 of this exemplary embodiment, an installation position of optical means 3 is adjusted on the basis of the result, and subsequently the process proceeds to the next step of pressing optical means 3 against display panel 2 for fixedly cementing them. This allows optical means 3 to be fixed on display panel 2 with high accuracy. Accordingly, high quality display apparatus 1 can be acquired.

(Fourth Exemplary Embodiment)

Figure 26:
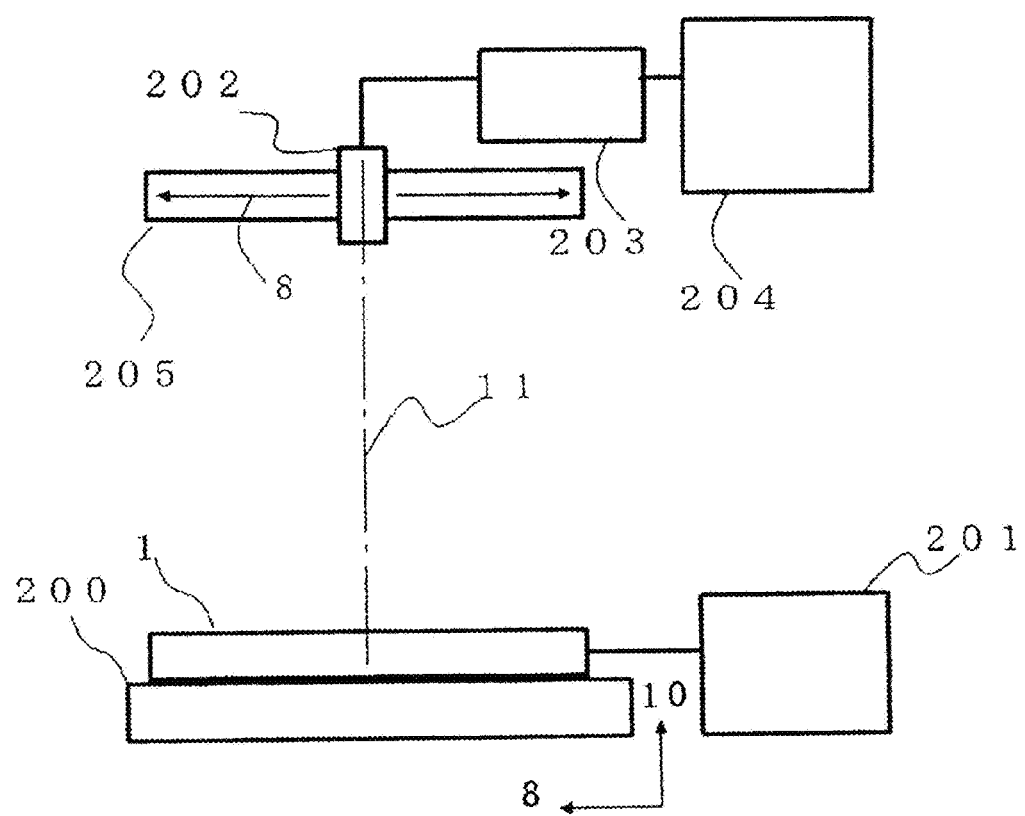
FIG. 26 is a block diagram showing an example of another configuration of an inspection apparatus of the present invention.

FIG. 26 is a block diagram showing an example of another configuration of an inspection apparatus of the present invention.

As shown in FIG. 26, inspection apparatus 220 of a fourth exemplary embodiment has a configuration in which moving means 205 is added to inspection apparatus 210 described in the third exemplary embodiment. Inspection apparatus 220 of the fourth exemplary embodiment has a configuration appropriate for use in a case where boundary line segments appear in inspection image 73 shown in FIG. 24.

Moving means 205 moves inspection camera 202 in x axis direction 8 in parallel to the display screen of display apparatus 1. The center of the moving axis in the y direction (not shown) matches with display center 11. Inspection camera 202 shown in FIG. 26 can be moved in x direction 8 on the basis of the size of the viewpoint pitch of the display apparatus 1.

Figure 27:
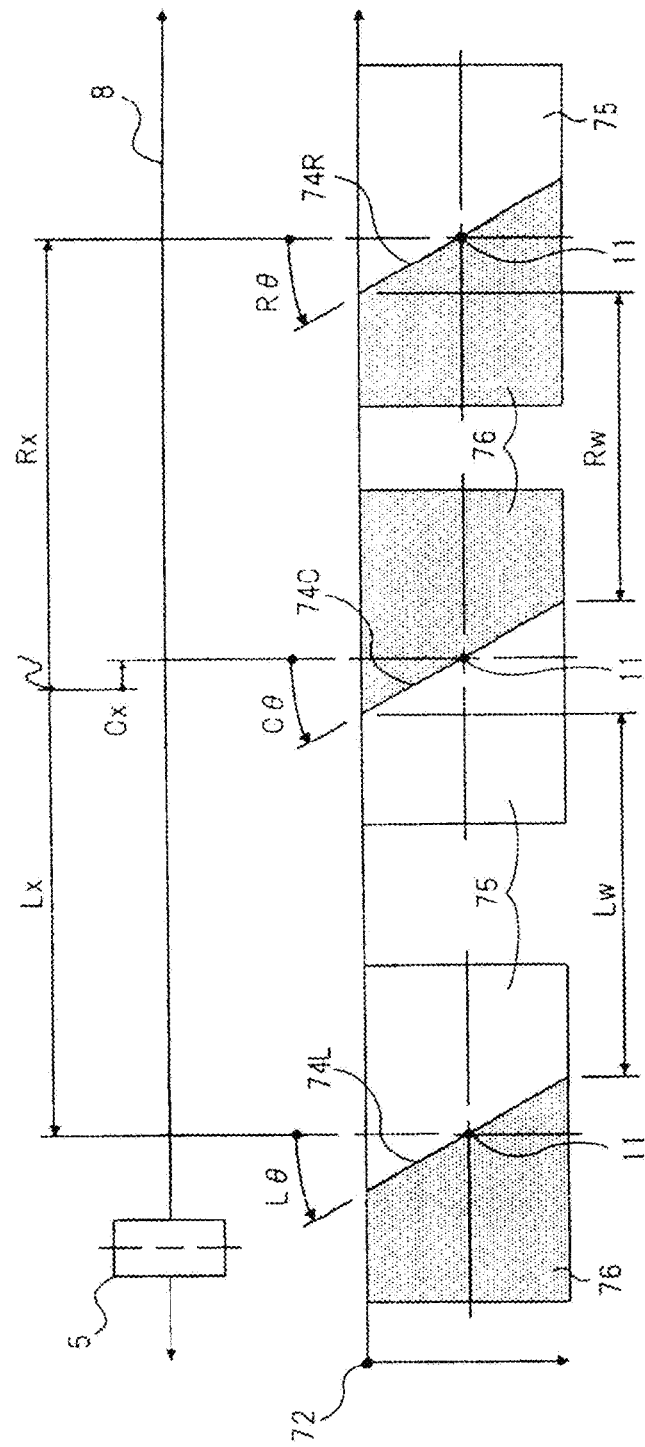
FIG. 27 is a schematic diagram showing an example of inspection images acquired by an inspection apparatus of a fourth exemplary embodiment.

FIG. 27 is a schematic diagram showing an example of an inspection image acquired by the inspection apparatus of the fourth exemplary embodiment.

FIG. 27 shows an example of inspection image 73 taken by inspection camera 202 at three points using the inspection method described in the First Example while moving means 205 moves the camera in x axis direction 8. Each inspection image 73 is acquired by photographing such that the center of boundary line segment 74 in the y axis direction matches with display center 11.

Here, it is provided that the amounts of movement from the center of moving means 205 when position Δx of the boundary line segment is zero are Lx, Cx and Rx. In this case, slopes Lθ, Cθ and Rθ can be extracted from boundary line segments 74L, 74C and 74R of inspection images 73.

Rx corresponds to |x2.center-x1.center| in the second exemplary embodiment. Lx corresponds to |x3.center-x2.center|. Lθ corresponds to θ1. Cθ corresponds to θ2. Rθ corresponds to θ3.

Accordingly, even if the photographing distance is set to second distance 55, the addition of moving means 205 allows information acquired from the inspection image to be increased as with the advantageous effects described in the second exemplary embodiment.

The inspection apparatus of this exemplary embodiment is capable of acquiring information of slopes θ, positions Δx and the viewpoint pitches of boundary line segments. Accordingly, in addition to the positional accuracy between display panel 2 and optical means 3, the distortion of optical means 3 can also be acquired.

The invention claimed is:

1. A mounting accuracy inspection method for inspecting positional accuracy between a display panel, in which pixel groups are arranged so that each of the pixel groups includes N (N is natural number more than one) pixels corresponding to N viewpoints, and optical means for providing image display for the N viewpoints corresponding to the pixels based on images displayed on each of the pixels, said display panel and said optical means being included in a display apparatus, the method comprising:
    a displaying step displaying a test pattern that includes different image signals, which correspond to respective ones of the N viewpoints, on the display apparatus, the different image signals corresponding to at least a pair of adjacent ones of the N viewpoints, to input the different image signals to the respective pixels corresponding to the N viewpoints; and
    an extracting step adopting the image displayed on said display apparatus as an inspection image, and extracting a slope and a position of a boundary line segment between images corresponding to the pair of the adjacent ones of the N viewpoints in said inspection image.

2. The mounting accuracy inspection method according to claim 1, further comprising:
    a photographing step photographing the displayed test pattern at a prescribed photographing distance by photographing means, and thus acquiring the inspection image,
    wherein said extracting step extracts the slope and the position of the boundary line segment between the images corresponding to the pair of the adjacent ones of the N viewpoints from said inspection image photographed by said photographing step.

3. The mounting accuracy inspection method according to claim 1,
    wherein said displaying step includes:
    a first displaying step displaying the test pattern; and
    a second displaying step displaying a second test pattern different from that of the test pattern used in said first displaying step.

4. The mounting accuracy inspection method according to claim 1, wherein said displaying step displays a first pattern including an image signal including a prescribed color and gradation value for a viewpoint whose number N is odd, and said displaying step displays a second pattern including an image signal different from that of said first pattern for a viewpoint whose number N is even, among the N viewpoints.

5. The mounting accuracy inspection method according to claim 1,
wherein said displaying step includes:
a first displaying step that displays a first pattern including an image signal including a prescribed color and gradation value for a viewpoint whose number N is odd, and that displays a second pattern including an image signal different from said first pattern for a viewpoint whose number N is even, among the N viewpoints; and
a second displaying step that displays said second pattern for the viewpoint whose number N is odd, and that displays said first pattern for the viewpoint whose number N is even.

6. The mounting accuracy inspection method according to claim 1, wherein said displaying step, in a case where first to (N/2)-th viewpoints are classified into a first viewpoint group and (N/2+1)-th to N viewpoints are classified into a second viewpoint group among the N viewpoints (N is an even number), displays the test patterns including image signals different in the respective two viewpoint groups on said display apparatus.

7. The mounting accuracy inspection method according to claim 6,
wherein said displaying step includes:
a first displaying step that displays a first pattern including an image signal including a prescribed color and gradation value for the first viewpoint group, and that displays a second pattern including an image signal different from that of said first pattern for the second viewpoint group; and
a second displaying step that displays said second pattern for said first viewpoint group, and that displays said first pattern for said second viewpoint group.

8. The mounting accuracy inspection method according to claim 1, wherein said displaying step displays test patterns including image signals different in the ((N+1)/2)-th viewpoint and other viewpoints, among the N viewpoints (N is an odd number), on said display apparatus.

9. The mounting accuracy inspection method according to claim 8,
wherein said displaying step includes:
a first displaying step that displays a first pattern including one image signal for a ((N+1)/2)-th viewpoint, and displays a second pattern including an image signal different from that of the first pattern for other viewpoints; and
a second displaying step that displays said second pattern for the ((N+1)/2)-th viewpoint, and displays said first pattern for the other viewpoints.

10. The mounting accuracy inspection method according to claim 3, wherein said extracting step takes an average of slopes and an average of positions of the boundary line segment between the viewpoints and extracts averaged slope and position, from a first inspection image acquired by said photographing step after said first displaying step, and a second inspection image acquired by said photographing step after said second displaying step.

11. The mounting accuracy inspection method according to claim 6, wherein said extracting step extracts the slope and the position of the boundary line segment between the (N/2)-th and (N/2+1) viewpoints from the inspection image acquired by said displaying step of the N viewpoints (N is an even number).

12. The mounting accuracy inspection method according to claim 8, wherein said extracting step takes an average of slopes and an average of positions of a first boundary segment between ((N−1)/2) and (((N−1)/2+1) viewpoints and a second boundary segment between ((N+1)/2) and ((N+1)/2+1) viewpoints, from the inspection images acquired by the displaying of the N viewpoints (N is an odd number), and extracts averaged slope and position.

13. The mounting accuracy inspection method according to claim 1, wherein the test pattern includes an image signal capable of extracting the slope and position of the boundary line segment of said inspection image.

14. The mounting accuracy inspection method according to claim 2, wherein said photographing step, in a case of regarding a pitch of viewpoint images formed by the optical means as a viewpoint pitch, takes an image such that a photographing center of said photographing means matches with a center in a direction of the viewpoint pitch of said display apparatus.

15. The mounting accuracy inspection method according to claim 2, wherein the prescribed photographing distance between said display apparatus and said photographing means is set to be shorter than a minimum distance where a stereoscopic viewable region of said display apparatus exists.

16. The mounting accuracy inspection method according to claim 2, wherein the prescribed photographing distance between said display apparatus and said photographing means is set to be longer than a minimum distance where a stereoscopic viewable region of said display apparatus exists.

17. The mounting accuracy inspection method according to claim 15, wherein the photographing distance is set as a photographing distance at which an inspection image including at least three of the boundary line segments can be acquired.

18. The mounting accuracy inspection method according to claim 16, wherein said method, in a case of regarding a pitch of each viewpoint image formed by said optical means as a viewpoint pitch, acquires an inspection image including boundary line segments at least two points in a direction of a viewpoint pitch.

19. The mounting accuracy inspection method according to claim 15, wherein said method, in a relationship of the slope of the boundary line segment to the photographing distance between said display apparatus and said photographing means, sets a region in which variation in a differential coefficient of the slope to the photographing distance converges within ±5% as the photographing distance.

20. The mounting accuracy inspection method according to claim 15, wherein said method sets, in a relationship of the slope of said boundary line segment to the photographing distance between said display apparatus and said photographing means, the photographing distance with which a differential coefficient of the slope to the photographing distance is minimized as the photographing distance.

21. An inspection apparatus for inspecting positional accuracy between a display panel, in which pixel groups are arranged so that each of the pixel groups includes N (N is natural number more than one) pixels corresponding to N viewpoints, and optical means for providing image display for the N viewpoints corresponding to the pixels based on images displayed on each of the pixels, in a display apparatus including said display panel and said optical means, the inspection apparatus comprising:
an image output device outputting on the display apparatus a test pattern that includes different image signals, which correspond to respective ones of the N viewpoints, the different image signals corresponding to at least a pair of adjacent ones of the N viewpoints, to input the different image signals to the respective pixels corresponding to the N viewpoints; and
an extraction device extracting a slope and a position of a boundary line segment between images corresponding to the pair of the adjacent ones of the N viewpoints in an inspection image displayed on said display apparatus, wherein the inspection apparatus detects the positional accuracy between said display panel and said optical means on the basis of the slope and the position extracted by said extraction device.

22. The inspection apparatus according to claim 21, further comprising:

a photographing device photographing the boundary line segment appearing when the test pattern is displayed.

23. The inspection apparatus according to claim 22, further comprising a moving device moving said photographing device in a direction of a viewpoint pitch so as to image at least two of said boundary line segments.

24. The inspection apparatus according to claim 22, wherein a photographing distance of said photographing device to the display panel is fixed, within a distance which is shorter than an observation distance where a stereoscopic viewable region is minimized, and within a distance where the stereoscopic viewable region does not exist.

* * * * *